United States Patent
Shearer et al.

(10) Patent No.: US 9,538,603 B2
(45) Date of Patent: Jan. 3, 2017

(54) SYSTEMS AND METHODS FOR CONTROLLING COLOR TEMPERATURE

(71) Applicant: Lutron Electronics Co., Inc., Coopersburg, PA (US)

(72) Inventors: Thomas M. Shearer, Macungie, PA (US); Arya Abraham, Bethelehem, PA (US); Ethan Charles Biery, Orefield, PA (US); Timothy P. Gredler, Center Valley, PA (US); Juha Mikko Hakkarainen, Palm Beach Gardens, FL (US)

(73) Assignee: LUTRON ELECTRONICS CO., INC., Coopersburg, PA (US)

( * ) Notice: Subject to any disclaimer, the term of this patent is extended or adjusted under 35 U.S.C. 154(b) by 0 days.

(21) Appl. No.: 14/255,845

(22) Filed: Apr. 17, 2014

(65) Prior Publication Data
US 2014/0312777 A1   Oct. 23, 2014

Related U.S. Application Data

(60) Provisional application No. 61/814,109, filed on Apr. 19, 2013.

(51) Int. Cl.
*H05B 37/00* (2006.01)
*H05B 33/08* (2006.01)

(52) U.S. Cl.
CPC ...... *H05B 33/0869* (2013.01); *H05B 33/0872* (2013.01)

(58) Field of Classification Search
USPC ............... 315/149–155, 158, 291, 294, 297, 307, 315/309, 312
See application file for complete search history.

(56) References Cited

U.S. PATENT DOCUMENTS

| | | |
|---|---|---|
| 6,441,558 B1 * | 8/2002 | Muthu et al. ................ 315/149 |
| 6,636,003 B2 | 10/2003 | Rahm et al. |
| 6,788,011 B2 | 9/2004 | Mueller et al. |
| 6,975,079 B2 | 12/2005 | Lys et al. |
| 7,014,336 B1 | 3/2006 | Ducharme et al. |
| 7,038,399 B2 | 5/2006 | Lys et al. |
| 7,135,824 B2 | 11/2006 | Lys et al. |
| 7,161,311 B2 | 1/2007 | Mueller et al. |
| 7,186,003 B2 | 3/2007 | Dowling et al. |
| 7,202,613 B2 | 4/2007 | Morgan et al. |

(Continued)

*Primary Examiner* — Jason M Crawford
(74) *Attorney, Agent, or Firm* — Condo Roccia Koptiw LLP

(57) ABSTRACT

Controlling the color temperature of a composite light source including at least one discrete-spectrum light source is disclosed. For example, the color temperature of a composite light source including at least one discrete-spectrum light source may be determined and/or adjusted based on one or more of the ambient color temperature of a space, the actual temperature of the space, the relative brightness of the space, the occupancy of the space, a time clock, a demand response command (e.g., from an electrical utility), the absolute location of the composite light source, the location of the composite light source relative to other light sources, inputs from a camera or other external devices, the operation of appliances or other machines in the vicinity of the composite light source, media content being utilized in the vicinity of the composite light source, and/or other sensor inputs.

64 Claims, 18 Drawing Sheets
(2 of 18 Drawing Sheet(s) Filed in Color)

(56) References Cited

U.S. PATENT DOCUMENTS

| | | |
|---|---|---|
| 7,233,115 B2 | 6/2007 | Lys |
| 7,242,152 B2 | 7/2007 | Dowling et al. |
| 7,255,457 B2 | 8/2007 | Ducharme et al. |
| 7,256,554 B2 | 8/2007 | Lys |
| 7,288,902 B1 | 10/2007 | Melanson |
| 7,300,192 B2 | 11/2007 | Mueller et al. |
| 7,308,296 B2 | 12/2007 | Lys et al. |
| 7,352,138 B2 | 4/2008 | Lys et al. |
| 7,358,706 B2 | 4/2008 | Lys |
| 7,387,405 B2 | 6/2008 | Ducharme et al. |
| 7,459,864 B2 | 12/2008 | Lys |
| 7,462,997 B2 | 12/2008 | Mueller et al. |
| 7,511,437 B2 | 3/2009 | Lys et al. |
| 7,659,674 B2 | 2/2010 | Mueller et al. |
| 7,791,289 B2 | 9/2010 | Oosterbaan et al. |
| 7,868,562 B2 * | 1/2011 | Salsbury et al. ............. 315/307 |
| 7,872,430 B2 * | 1/2011 | Roberts ............... G09G 3/3406 315/291 |
| 8,120,279 B2 | 2/2012 | Oosterbaan et al. |
| 8,354,803 B2 | 1/2013 | Newman, Jr. et al. |
| 8,492,987 B2 | 7/2013 | Nuhfer et al. |
| 8,952,626 B2 * | 2/2015 | Huang et al. ................ 315/291 |
| 2004/0105264 A1 * | 6/2004 | Spero ............................ 362/276 |
| 2005/0110416 A1 * | 5/2005 | Veskovic ................. E06B 9/32 315/149 |
| 2007/0040512 A1 * | 2/2007 | Jungwirth et al. ........... 315/159 |
| 2008/0191631 A1 * | 8/2008 | Archenhold et al. ......... 315/158 |
| 2010/0072901 A1 * | 3/2010 | De Rijck et al. ............ 315/152 |
| 2010/0277070 A1 * | 11/2010 | Butteris ............ H05B 33/0854 315/113 |
| 2012/0206050 A1 * | 8/2012 | Spero ...................... B60Q 1/04 315/152 |
| 2013/0002144 A1 * | 1/2013 | Adler ....................... F21S 2/00 315/153 |
| 2015/0035440 A1 * | 2/2015 | Spero ........................... 315/153 |

* cited by examiner

SYSTEMS AND METHODS FOR CONTROLLING COLOR TEMPERATURE

CROSS-REFERENCE TO RELATED APPLICATIONS

This application claims the benefit of U.S. Provisional Patent Application No. 61/814,109, filed Apr. 19, 2013, the entire disclosure of which is incorporated by reference herein.

BACKGROUND

Traditional sources of light such as the Sun (and later incandescent lights) may exhibit the characteristics of a black body radiator. Such light sources typically emit a relatively continuous-spectrum of light, and the continuous emissions range the entire bandwidth of the visible light spectrum (e.g., light with wavelengths between approximately 390 nm and 700 nm). The human eye has grown accustomed to operating in the presence of black body radiators and has evolved to be able to distinguish a large variety of colors when emissions from a black body radiator are reflected off an object of interest.

Further, the frequency or wavelength of the continuous light spectrum emitted by a black body radiator may be dependent on the temperature of the black body radiator. Plank's law states that a black body radiator in thermal equilibrium will emit a continuous-spectrum of light that is dependent on the equilibrium temperature of the black body. FIG. 1 illustrates the Black Body Radiator Curve according to Plank's law.

As shown in FIG. 1, as the temperature of the black body radiator increases, the frequency of the peak of the emitted spectrum shifts to higher frequencies. At room temperature (e.g., roughly 300 Kelvin (K)), the frequency peak is typically within the infrared portion of the spectrum and thus is imperceptible to the human eye. However, when the temperature is increased to approximately 700-750 K, the black-body radiator will begin to emit light in the visible range of the electromagnetic spectrum.

Typically, as the temperature of the black body radiator decreases, the wavelength of the emitted light increases and the frequency decreases, such that the emitted light appears "redder". As the temperature increases, the peak of the emitted spectrum become "bluer" or decreases in wavelength (e.g., increases in frequency). For black body radiators, this relationship between temperature and wavelength/frequency of the emitted light is inseparable—higher temperature radiators appear bluer and lower temperature radiators appear redder.

Thus, various wavelengths/frequencies of the visible light spectrum may be associated with a given "color temperature" of a black body radiator. FIG. 2 illustrates an example comparison of the colors associated with different color temperature values. The color temperature of a light source may refer to the temperature of an ideal black body radiator that radiates light of comparable hue to that of the light source. As shown in FIG. 2, candlelight, tungsten light (e.g., from an incandescent bulb), early sunrise, and/or household light bulbs may appear to have relatively low color temperatures, for example on the range of 1,000-3,000 K. Noon daylight, direct sun (e.g., sunlight above the atmosphere), and/or electronic flash bulbs may appear to have color temperature values on the order of 4,000-5,000 K and may have a greenish blue hue. An overcast day may appear to have a color temperature of approximately 7,000 K and may be even bluer than noon daylight. North light may be bluer still, appearing to have a color temperature on the range of 10,000 K.

Color temperatures over 5,000 K are often referred to as cool colors (e.g., bluish white to deep blue), while lower color temperatures (e.g., 2,700-3,000 K) are often referred to as warm colors (e.g., red through yellowish white).

Incandescent and halogen lamps typically act as black body radiators. For example, a current is passed through a wire (e.g., a filament), causing the wire to increase in temperature. When the wire reaches a critical temperature, it begins to radiate light in the visible spectrum. The color temperature of the radiated light is dictated by Plank's law. When an incandescent or halogen light is dimmed, the temperature (and color temperature) is decreased, meaning that the emitter light becomes redder (e.g., higher wavelength, lower frequency). Thus, humans are accustomed to dimmed lights having a redder hue.

Recently, non-incandescent light sources such as fluorescent lights (e.g., compact fluorescent lights or CFLs) and light emitting diodes (LEDs) have become more widely available due to their relative power savings as compared to traditional incandescent lamps. Typically light from CFLs or LEDs does not exhibit the properties of a black body radiator. Instead, the emitted light is often more discrete in nature due to the differing mechanisms by which CFLs and/or LEDs generate light as compared to an incandescent or Halogen light bulbs. Since fluorescents and LEDs do not emit relatively constant amounts of light across the visible light spectrum (e.g., instead having peaked intensities at one or more discrete points within the visible spectrum), fluorescents and LEDs are often referred to as discrete-spectrum light sources.

The wavelength/frequency profile of a light source may be dependent on the device or technique used to generate the light. For example, light from fluorescent lamps is produced by electrically exciting mercury within a glass tube. The applied voltage causes the mercury to become a plasma that emits light in the ultraviolet (UV) frequency range. Typically, the glass tube is coated with a phosphorus-based material that absorbs the radiated UV light and then emits light in the visible frequency range. The wavelength shift from UV to the visible range is referred to as Stokes shift. Depending on the properties of the phosphorus-based material, the wavelength/frequency of the light emitted may be at different points within the visible spectrum. FIG. 3 illustrates the discrete-spectrum emitted by an example CFL as compared to an example continuous light source such as an incandescent lamp. For example, the line $SP_{DISC\text{-}FLUOR}$ 310 may represent the relative intensity of light emitted at various wavelengths by an example CFL, and the line $SP_{CONT}$ 320 may represent the relative intensity of light emitted at the same wavelengths by an example incandescent lamp. As may be seen in FIG. 3, the fluorescent light source may be characterized by one or more "bursts" of emissions at discrete frequencies/wavelengths.

Light from LEDs is produced due to the physical properties of a semiconducting material. For example, when a voltage is applied across a semiconductor junction that has different levels of electron doping across the boundary, an electric current is induced. When an electron from one side of the device recombines with an electron hole on the other, a photon is emitted. Depending on the semiconductor design, the photons may be emitted at various wavelengths/frequencies within the visible light spectrum. Like fluorescents, Stokes shift may cause the frequency of the emitted photons to be lowered to achieve a desired light frequency output. FIG. 4 illustrates the discrete-spectrum emitted by an example LED as compared to an example continuous light source such as an incandescent lamp. For example, the line $SP_{DISC-LED}$ 410 may represent the relative intensity of light emitted at various wavelengths by an example LED, and the line $SP_{CONT}$ 420 may represent the relative intensity of light emitted at the same wavelengths by an example incandescent lamp. Like the emissions from the fluorescent lamp, the LED light may also be relatively discrete in nature.

When discrete-spectrum light sources are dimmed, their color temperature may not change in the same manner as black body radiators. For example, when incandescents and halogens are dimmed, their temperature is decreased and the emitted light transitions to a lower color temperature value (e.g., becomes redder) according to Plank's law. However, since discrete-spectrum light sources are not black body radiators, Plank's law may not apply. For example, both fluorescent lamps and LEDs may maintain a relatively constant color temperature even in the presence of dimming (e.g., and may actually become slightly bluer or higher frequency as they are dimmed). Such an effect may be unnatural to the human eye, which may expect the color temperature to shift to a redder temperature as the light dims. Moreover, when discrete-spectrum light sources are placed in the vicinity of other light sources, for example sources of light whose color temperature may change over time, the discrete-spectrum light sources can appear unnatural or distracting.

SUMMARY

Methods and systems are disclosed for controlling the color temperature of one or more light sources based on environmental criteria and/or user preferences. For example, a composite lighting load including at least one discrete-spectrum light source and at least one additional light source may be controlled by a load control system in order to vary the color temperature of the light emitted by the composite lighting load. For example, the color temperature of the at least one discrete-spectrum light source may be determined and/or adjusted based on one or more of the ambient color temperature of a space, the actual temperature of the space, the relative brightness of the space, the occupancy of the space, a time clock, a demand response command (e.g., from an electrical utility), the absolute location of the discrete-spectrum light source, the location of the discrete-spectrum light source relative to other light sources, inputs from a camera or other external devices, the operation of appliances or other machines in the vicinity of the discrete-spectrum light source, media content being utilized in the vicinity of the discrete-spectrum light source, and/or other sensor inputs. The light emitted from the composite lighting load may be made redder (e.g., higher wavelength, lower frequency) in response to a first set of criteria and/or the discrete-spectrum light source may be made bluer (e.g., lower wavelength, higher frequency) in response to a second set of criteria.

For example, a system controller may be configured to control the color temperature of one or more controllable-color-temperature lighting loads. Controllable-color-temperature lighting loads (CCTLLs) may also be referred to as color temperature controllable lighting loads. The system controller may receive one or more input signals (e.g., ambient color temperature of a space, actual temperature of a space, the relative brightness of the space, the occupancy of the space, etc.) and may send a signal indicating a determined color temperature and/or a determined change in color temperature to the one or more controllable-color-temperature lighting loads. The indications may be specific to each respective controllable-color-temperature lighting load. The controllable-color-temperature lighting loads may change their respective color temperature levels based on the signal received from the system controller.

In an example, the controllable-color-temperature lighting load may include a control circuit and two or more discrete-spectrum light sources. The discrete-spectrum light sources may be operably coupled to a color temperature load regulation system that is configured to vary the intensity of one or more of the discrete-spectrum light sources in order to vary the color temperature of the controllable-color-temperature lighting load. For example, the color temperature load regulation system may include load regulation circuitry configured such that the control circuit may vary the color temperature of the combined emissions from the discrete-spectrum light sources. The control circuit may also be operably coupled to a communication circuit for communicating with the system controller. In an example, rather than or in addition to utilizing a system controller to control each of the controllable-color-temperature lighting loads in the system, the controllable-color-temperature lighting loads may be configured to communicate with each other and operate in an ad hoc manner.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

DETAILED DESCRIPTION

Figure 1:
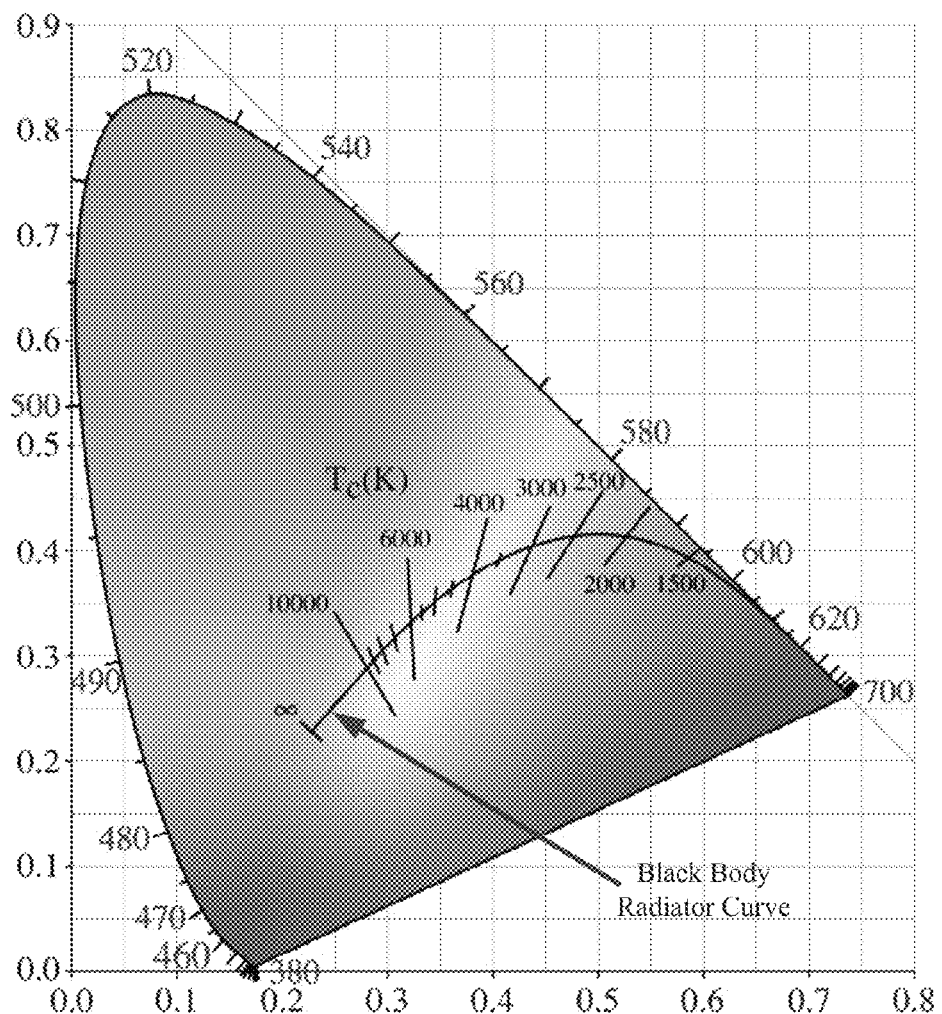
FIG. 1 depicts an example of the black body color temperature curve according to Plank's law.
Figure 2:
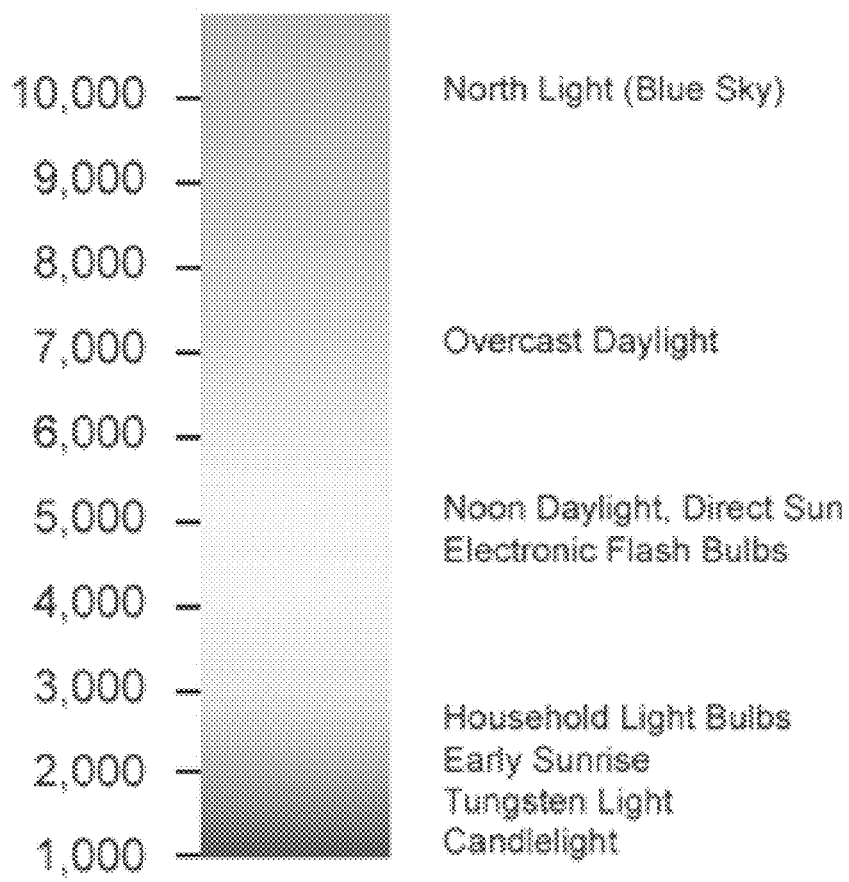
FIG. 2 illustrates an example comparison of the colors associated with different color temperature values.

The various systems and methods described herein may make reference to determining, changing, or varying the color temperature of light source. For example, reference may be made to reddening a light source, making a light source redder, making a light source appear redder, shifting light towards red, warming the light, and/or otherwise shifting the light to a higher wavelength/lower frequency. Such terms may refer to the process of changing the effective or composite color temperature of a light source to a lower color temperature. Similarly, the process of changing the effective or composite color temperature of a light source to a higher color temperature may be referred to as bluing a light source, making a light source bluer, making a light source appear bluer, shifting light towards blue, cooling the light, and/or otherwise shifting the light to a lower wavelength/higher frequency. As may be appreciated, there may be numerous physical means for shifting the color temperature of a discrete-spectrum light source.

For example, two or more discrete-spectrum light sources may be controlled to vary the effective color temperature of a combined or composite light emitted from the two or more discrete-spectrum light sources. When used herein, the term composite light or combined light emitted from two or more light sources may refer to the mixed or joint emissions of light as seen from an observer at a distance away from the light source. For example, the light sources may be included in a single light fixture, and to an observer in a room that includes the fixture the composite light emitted by the two or more light sources may appear to be from as a single light source. The light fixture may or may not include a diffuser or other instrument that makes it appear the composite light emitted from the two or more discrete-spectrum light sources is emitted from a single light source.

In another example, although a first light source may be included in a different lighting fixture than a second light source, the two light sources may be located sufficiently close together from the perspective of an observer that their composite emissions appear to be from a single light source. As may be appreciated, the relative proximity of two or more light sources that emit composite or combined light emissions may vary depending on the position or distance of a desired target or observer of the composite light emissions. For example, the two or more light sources may be located relatively close together (e.g., in the same fixture) if the target or observer of the composite light is relatively close to the light sources (e.g., in the same room). However, if the target or observer is farther away, the two or more light sources may be separated by a greater distance. Further, although an observer looking directly at a CCTLL may be able to observe the two or more individual light sources, the CCTLL may be designed to provide a certain color temperature of light on a given surface. Thus, although the individual light sources may be relatively far apart or may appear as distinct light sources to a person staring at the CCTLL, the CCTLL may still be configured to provide the desired color temperature of light across the target surface.

As noted above, the composite light may be the combined emissions of two or more discrete-spectrum light sources. In another example, one or more discrete-spectrum light sources may be used in combination with a continuous-spectrum light source such as an incandescent or halogen lamp. The composite light emitted from such a device may include the light emitted from the continuous-spectrum light source (e.g., and potentially multiple continuous-spectrum light sources) and the one or more discrete-spectrum light sources. Various combinations of discrete-spectrum light sources and continuous-spectrum light sources may be utilized, as is described in more detail herein.

Figure 3:
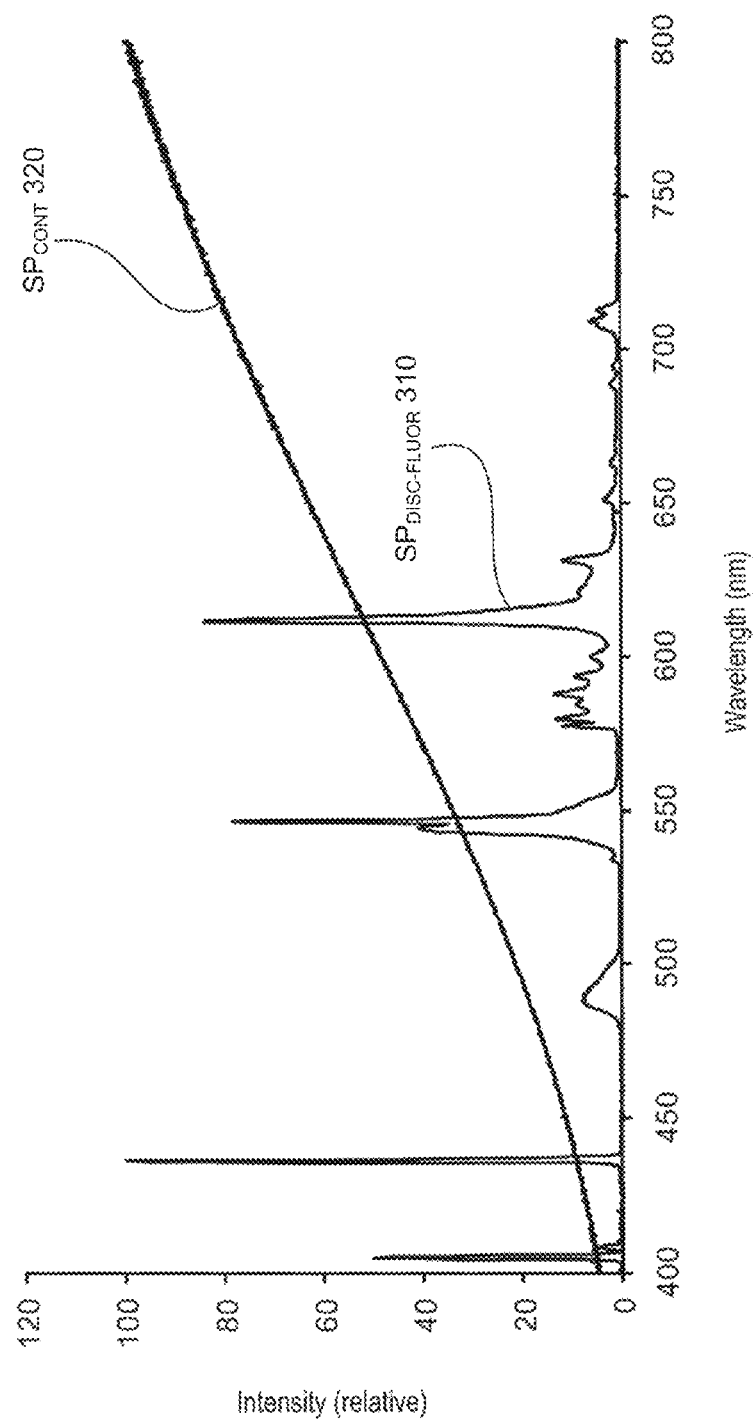
FIG. 3 depicts exemplary emissions of an example fluorescent lamp within the visible light spectrum.
Figure 4:
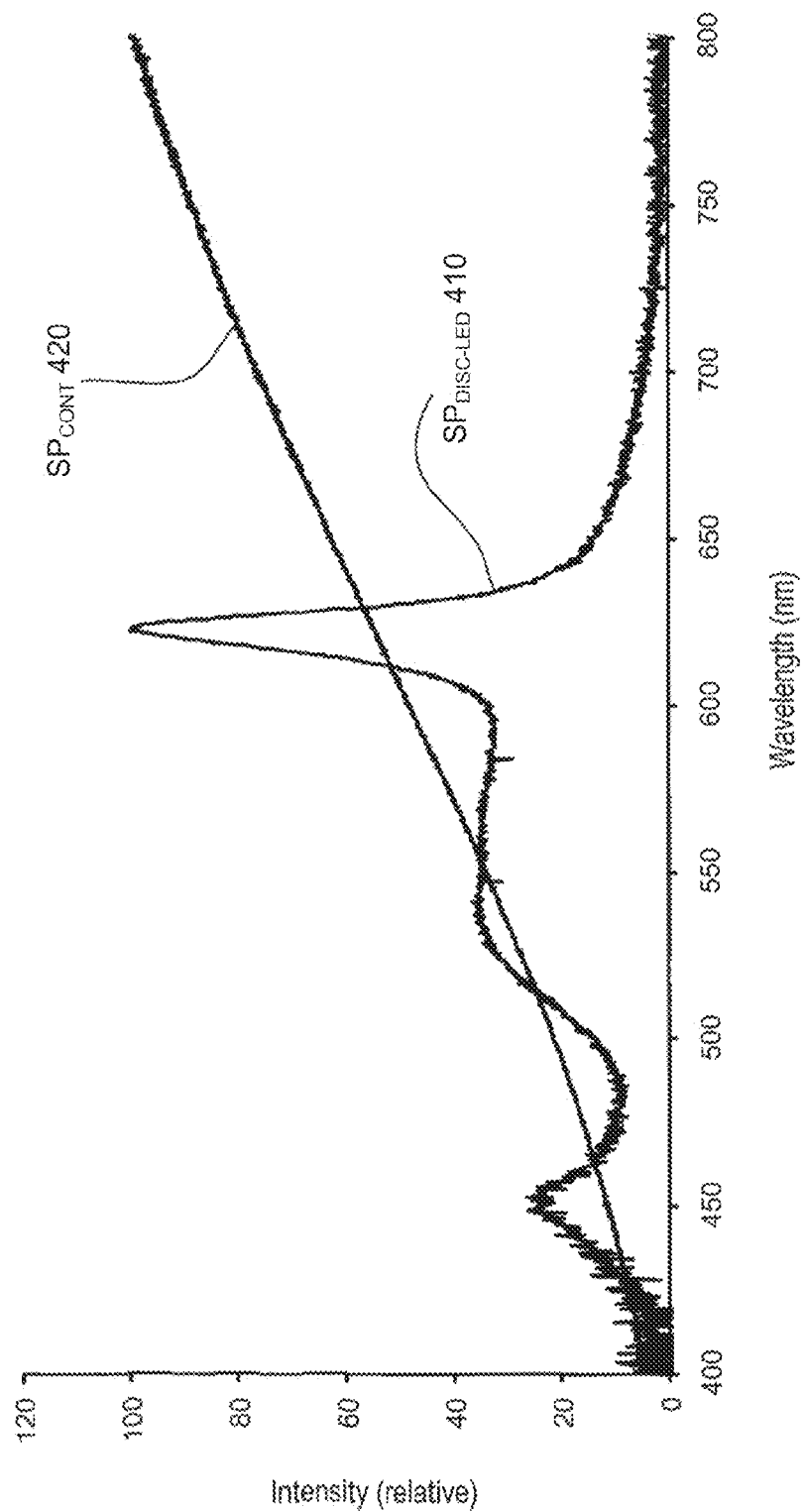
FIG. 4 depicts exemplary emissions of an example LED within the visible light spectrum.

As an example, as noted with respect FIGS. 3 and 4, discrete-spectrum light sources may be associated with various "spikes" or discrete portions of the electromagnetic spectrum at which the lamp radiates relatively intense emissions of light. The material used to coat the glass surrounding the discrete-spectrum light source (e.g., typically a phosphor or phosphor-like material) may cause the light to be emitted at desired frequency range due to Stokes shift. For example, a first discrete-spectrum light source may naturally emit light near the high frequency end of the visible light spectrum (e.g., a LED may be configured to emit light with a color temperature on the range of 10,000 K). A first coating may be applied to glass surrounding the first discrete-spectrum light source in order to shift the light to a lower frequency (e.g., make the color temperature redder). Thus, the majority of the light emitted from first discrete-spectrum light source surrounded by the coated glass may be of a lower color temperature than would be emitted by the discrete-spectrum light source without encapsulating it in the glass.

Multiple discrete-spectrum light sources may be used to achieve various effective color temperatures. For example, if a first discrete-spectrum light source has an effective color temperature in the red range (e.g., on the order of 1,000 to 2,000 K) and a second discrete-spectrum light source has an effective color temperature in the blue range (e.g., on the order of 10,000 K), then the total combined color temperature or composite color temperature of light emitted from the combination of the first discrete-spectrum light source and the second discrete-spectrum light source may be of greenish hue (e.g., on the order of 4,000-5,000 K) due to the human eye's perception of the composite light emitted by the two light sources. As may be appreciated, by utilizing more discrete-spectrum light sources emitting light associated with various color temperature values, more exact color temperature control may be achieved.

For purposes of description, the term controllable-color-temperature lighting load (CCTLL) may be used to refer to a device comprising at least one discrete-spectrum light source, at least one additional light source, and one or more load control elements used to adjust the intensity of one or more of the at least one discrete-spectrum light source and the at least one additional light source in order to affect the perceived color temperature of the combined or composite light emissions from the at least one discrete-spectrum light source and the at least one additional light source. For example, a CCTLL may be implemented using two or more discrete-spectrum light sources. The CCTLL may include a load control system (e.g., having one or more load control circuits), and a composite lighting load having two or more discrete-spectrum light sources that each emit light at different color temperatures and that are each coupled to the load control system. The composite lighting load emits a composite light output characterized by a composite color temperature. The load control system of the CCTLL may be configured to control the intensity of at least one of the two or more discrete-spectrum light sources in order to affect the composite color temperature of the emitted composite light output.

For example, the load control system may maintain a constant intensity level for a first discrete-spectrum light source and may vary the intensity of a second discrete-spectrum light source. Increasing the intensity of the second discrete-spectrum light source may cause the composite color temperature of the light sources to become closer to that of the second discrete-spectrum light source. Decreasing the intensity of the second discrete-spectrum light source may cause the composite color temperature of the light sources to become closer to that of the first discrete-spectrum light source. The load control system of a CCTLL may be referred to as a controllable-color-temperature load control system.

In another example, rather than maintaining a constant intensity level at the first discrete-spectrum light source, the intensity levels of both the first discrete-spectrum light source and the second discrete-spectrum light source may be varied in order to achieve a desired color temperature value for the composite emissions from the first and second discrete-spectrum light sources. For example, a system controller and/or the load control system that controls the intensity levels of the first and second discrete-spectrum light sources may maintain a state table or other information in system memory that associates a desired color temperature value for composite light emissions with intensity levels of the first and second light sources. Thus, the controlling device may be able to determine appropriate intensity levels for each of a plurality of discrete-light sources based on the desired color temperature value of the composite light emitted by the plurality of discrete-spectrum light sources.

Further, in addition to the desired color temperature value of the composite light being used to select appropriate intensity levels of the discrete-spectrum light sources, the overall or combined intensity of the light may be used to select appropriate intensity levels for the underlying discreet-spectrum light sources. For example in a CCTLL that utilizes two-discrete spectrum light sources, a desired color temperature value for the composite light emitted by the CCTLL may be achieved using various combinations of intensity levels of the first and second discrete-spectrum light sources. However, although different combinations of intensity levels for the first and second discrete-spectrum light sources may be used to achieve approximately the same color temperature value of the composite emissions, the different combinations may result in different overall intensity levels of the composite light (e.g., the overall composite intensity may be dimmer for a first combination and brighter for a second combination). Thus, the system controller and/or the load control system that controls the intensity levels of the first and second discrete-spectrum light sources may determine the individual intensity levels of the first and second discrete-spectrum light sources based on both the desired color temperature value of the composite light and the desired overall intensity level of the composite light. Table 1 illustrates an example state table that may be maintained in order to determine appropriate intensity levels of the first and second discrete-spectrum light sources based on a desired color temperature value of the composite light and a desired overall intensity level of the composite light.

TABLE 1

| Desired Color Temperature Value of Composite Emissions (K) | Desired Intensity Level of Composite Emissions | Intensity Level of First Discrete-Spectrum Light Source | Intensity Level of Second Discrete-Spectrum Light Source |
|---|---|---|---|
| 8,000 | $L_{C1}$ | $L_{A1}$ | $L_{B1}$ |
| 4,000 | $L_{C1}$ | $L_{A2}$ | $L_{B2}$ |
| 2,000 | $L_{C1}$ | $L_{A3}$ | $L_{B3}$ |
| 8,000 | $L_{C2}$ | $L_{A4}$ | $L_{B4}$ |
| 4,000 | $L_{C2}$ | $L_{A5}$ | $L_{B5}$ |
| 2,000 | $L_{C2}$ | $L_{A6}$ | $L_{B6}$ |

Thus, in the example shown in Table 1, if the desired color temperature of emissions is approximately 8,000 K and the desired composite intensity level is $L_{C1}$, the first discrete-spectrum light source may be set to intensity level $L_{A1}$, and the second discrete-spectrum light source may be set to intensity level $L_{B1}$. As an example, such a composite color temperature and composite intensity level may correspond to the first discrete-spectrum light source operating at full intensity (e.g., $L_{A1}$=100%) and while the second-discrete spectrum light source operates at half intensity (e.g., $L_{B1}$=50%). If the color temperature is to be lowered to 4,000 K, but the overall composite intensity is to remain relatively constant, the first discrete-spectrum light source may be set to intensity level $L_{A2}$, and the second discrete-spectrum light source may be set to intensity level $L_{B2}$. In some instances, such a change in color temperature may be achieved by varying the intensity level of a single discrete-spectrum light source of the discrete-spectrum light sources. In another example, if the desired composite color temperature is to remain constant at 8,000 K but the overall composite intensity level is to be changed (e.g., dimmed) to level $L_{C2}$, the first discrete-spectrum light source may be set to intensity level $L_{A4}$, and the second discrete-spectrum light source may be set to intensity level $L_{B4}$. For example, such a composite intensity level $L_{C2}$ at color temperature 8,000 K may correspond to the first discrete-spectrum light source operating at half intensity (e.g., $L_{A4}$=50%) and while the second-discrete spectrum light source operates at quarter intensity (e.g., $L_{B4}$=25%).

Although the example described with respect to Table 1 utilizes two discrete-spectrum light sources, similar relationships may be determined for systems utilizing more than two discrete-spectrum light sources. For example, by utilizing more than two discrete-spectrum light sources higher degrees of granularity may be achieved for adjusting one or more of the desired color temperature value of the composite emissions and/or the desired intensity level of composite emissions. Additionally, in addition to one or more discrete-spectrum light sources, one or more continuous-spectrum light sources may be used in a CCTLL. However, when determining appropriate intensity values for light source include in a CCTLL that includes at least one continuous-spectrum light source, Plank's law should be taken into account for the continuous-spectrum light sources such that changes in intensity level may also change the color temperature of the light emitted by the continuous-spectrum light source. Such an effect may lead to non-linear relationships between intensity levels of light sources included in a CCTLL and the color temperature of the combine emissions and/or or the composite intensity level of the emissions, for example.

The controllable-color-temperature load control system may be manufactured and distributed separately from the light sources that it is configured to control. For example, the controllable-color-temperature load control system may be a configured as an interface circuit that is installed in series with light sources that may be separately supplied.

Figure 5A:
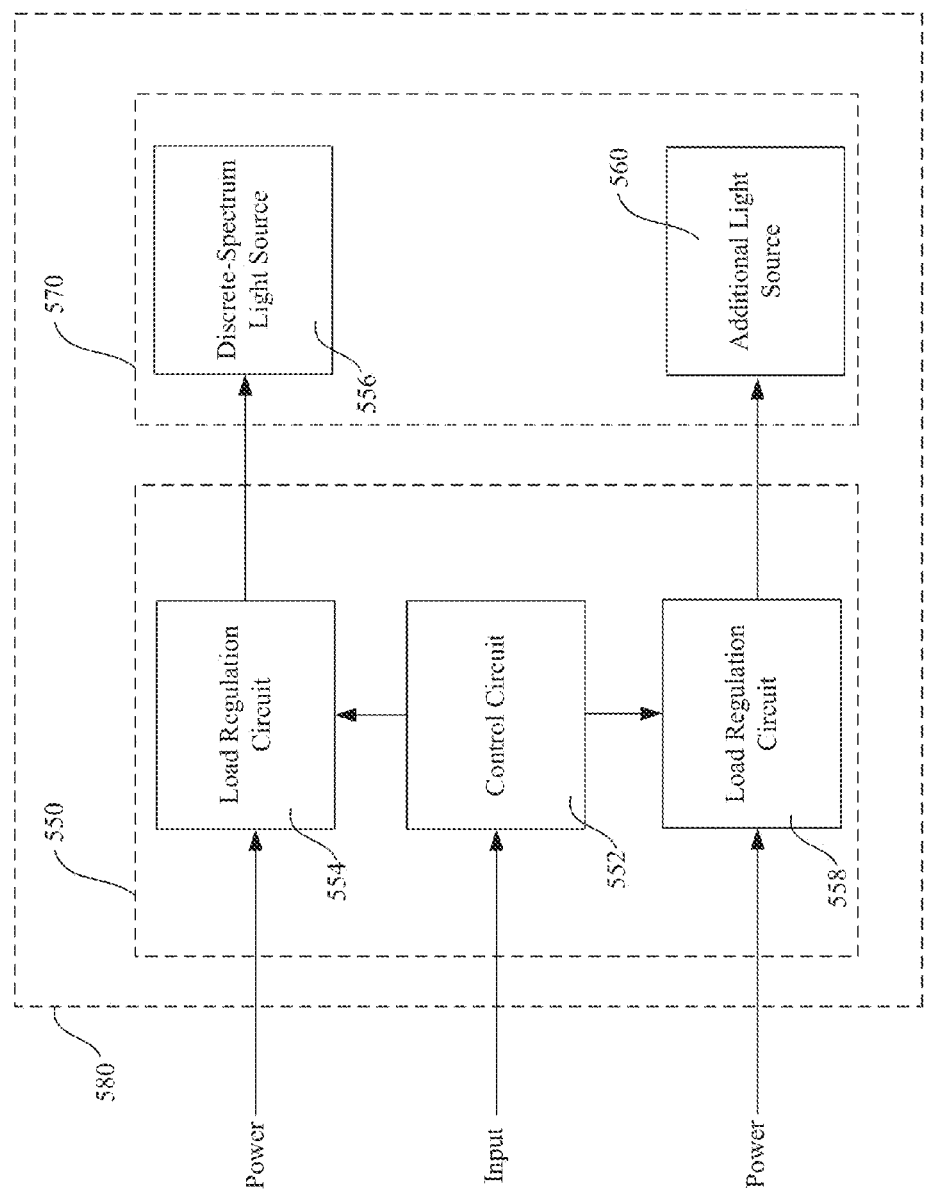
FIG. 5A depicts an example controllable-color-temperature lighting load.

FIG. 5A illustrates a block diagram of an example controllable-color-temperature lighting load. For example, a controllable-color-temperature lighting load 580 may include a controllable-color-temperature load control system 550. The controllable-color-temperature lighting load 580 may also include a composite lighting load 570. The composite lighting load 570 may include a plurality of light sources. The controllable-color-temperature load control system 550 may be configured to control one or more of the individual elements of the composite lighting load 570 in order to affect the color temperature of the light emitted by the composite light load.

For example, the composite lighting load 570 may include a discrete-spectrum light source 556 and an additional light source 560. The additional light source 560 may be a discrete-spectrum light source, a continuous-spectrum light source, or a hybrid light source. The controllable-color-temperature load control system 550 may be configured to control the discrete-spectrum light source 556 and/or the additional light source 560 in order to achieve a desired color temperature of the light emitted by the composite lighting load 570.

In order to control the color temperature of the light emitted by the composite lighting load 570, the controllable-color-temperature load control system 550 may include a control circuit 552, a first load regulation circuit 554, and a second load regulation circuit 558. The control circuit 552 may be configured to the first control load regulation circuit 554 in order to adjust the intensity of discrete-spectrum light source 556. The control circuit 552 may be configured to the second control load regulation circuit 558 in order to adjust the intensity of additional light source 560. The control signals may be analog signals and/or digital signals.

In an example, the control circuit 552 may be configured to control the second load regulation circuit 558 such that the additional light source 560 is maintained at a relatively constant intensity level. The control circuit 552 may then control the intensity of the discrete-spectrum light source 556 in order to affect the overall color temperature of the light emitted by the composite lighting load 570. In other examples, the intensity levels of both the discrete-spectrum light source 556 and the additional light source 560 may be controlled in order to affect the overall color temperature of the light emitted by the composite lighting load 570.

In an example, the controllable-color-temperature load control system 550 may be included in a different device than the composite lighting load 570 (e.g., the controllable-color-temperature load control system 550 may be located at a system controller, a dimmer, etc. and the composite lighting load 570 may be mounted at a lighting fixture), or each of the controllable-color-temperature load control system 550 and the composite lighting load 570 may be included in the same device (e.g., mounted in a lighting fixture). Further, the controllable-color-temperature load control system 550 may be implemented in a single device or multiple devices. For example, the control circuit 552 may be comprised or two (or more) individual control circuits for controlling the individual light sources of the composite lighting load 570. The individual control circuits may be in operative communication with each other and may be located in the same or different devices. For example, the individual control circuits may each be configured to control an individual load regulation circuits (e.g., one of the load regulation circuits 554, 558).

Figure 5B:
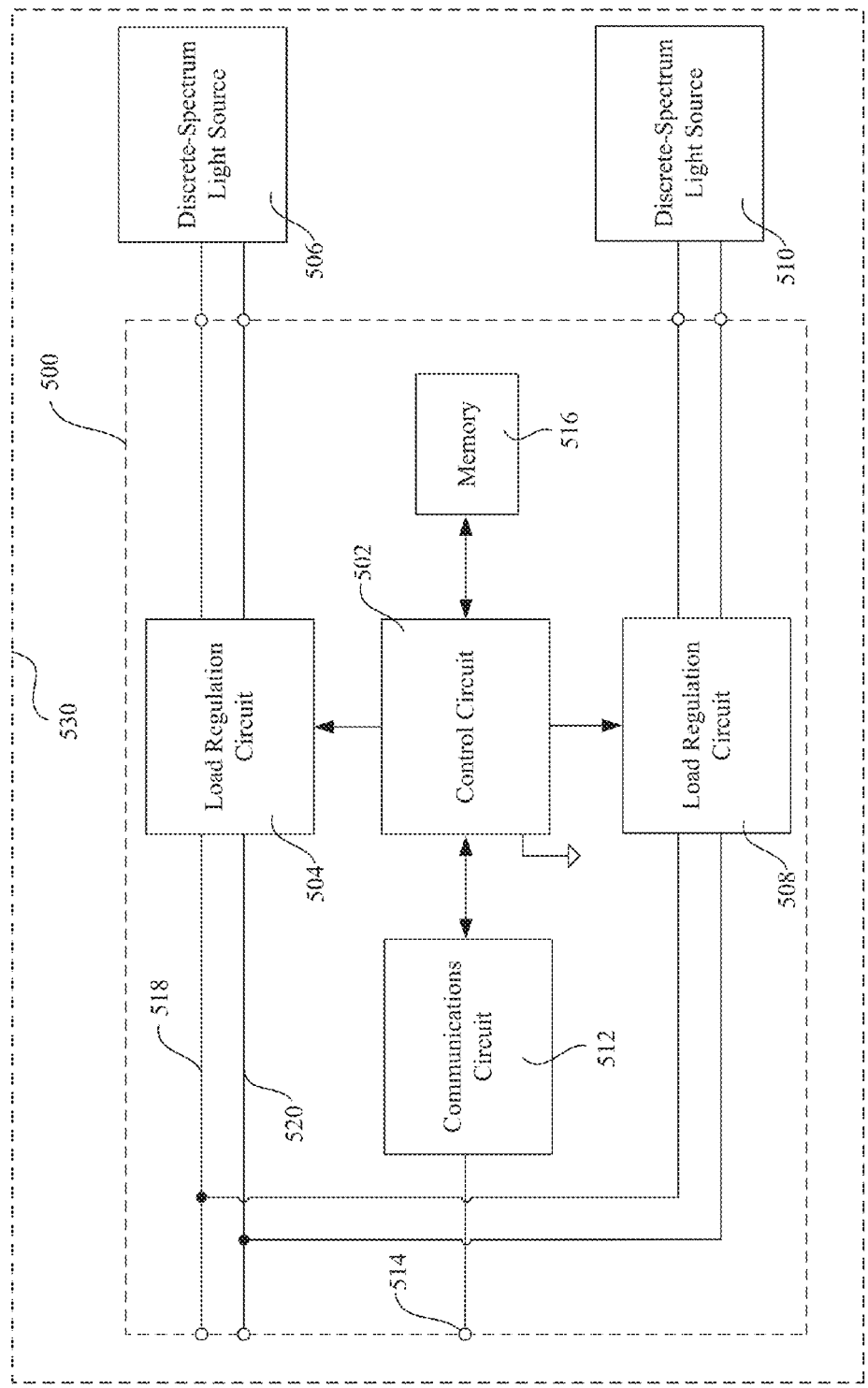
FIG. 5B depicts an example controllable-color-temperature lighting load that utilizes two or more discrete-spectrum light sources.

FIG. 5B illustrates an example controllable-color-temperature lighting load that is configured to vary the composite color temperature of light emitted by two discrete-spectrum light sources. For example, a controllable-color-temperature lighting load 530 may include a controllable-color-temperature load control system 500. For example, the controllable-color-temperature load control system 500 may comprise a dimmer switch, an electronic switch, an electronic ballast for one or more gas discharge lamps (e.g., fluorescent lamps), an LED driver for LED light sources, etc. The controllable-color-temperature load control system 500 may include a control circuit 502. The control circuit 502 may include one or more general purpose processors, special purpose processors, conventional processors, digital signal processors (DSPs), microprocessors, microcontrollers, integrated circuits, a programmable logic device (PLD), application specific integrated circuits (ASICs), or the like. The control circuit 502 may perform signal coding, data processing, power control, input/output processing, or any other functionality that enables the load control device to perform as described herein. An example of a load control device for an LED light source is described commonly-assigned U.S. Patent Application Publication No. 2011/0080110, published Apr. 7, 2011, entitled LOAD CONTROL DEVICE FOR A LIGHT-EMITTING DIODE LIGHT SOURCE, the entire disclosure of which is incorporated by reference herein.

For example, the control circuit 502 may send drive signals to a first load regulation circuit (LRC) 504 to control the power provided to a first discrete-spectrum light source 506. Although FIG. 5B may be described in terms of discrete-spectrum light sources (e.g., LEDs, fluorescents, etc.), one or more non-discrete-spectrum light sources may also be utilized. For example, continuous-spectrum light source(s) and/or hybrid light source(s) may be utilized. An example of a hybrid light source is described in commonly-assigned U.S. Pat. No. 8,228,002, issued Jul. 24, 2012, entitled HYBRID LIGHT SOURCE, the entire disclosure of which is incorporated by reference herein. The load regulation circuit 504 may receive current via a hot line 518 and a neutral line 520 (e.g., from an alternating-current (AC) power source) and may provide an amount of power to discrete-spectrum light source 506. The control circuit 502 may control the load regulation circuit 504 in order to adjust the intensity of (e.g., dim) the discrete-spectrum light source 506. For example, if the discrete-spectrum light source is an LED, the load regulation circuit 504 may include an LED driver that comprises a power converter circuit for generating a DC bus voltage and a LED drive circuit for receiving the bus voltage and adjusting the magnitude of the current conducted through the discrete-spectrum light source 506. The load regulation circuit 504 may be configured to adjust the intensity of the discrete-spectrum light source 506, for example using a pulse-width modulation technique or a constant current reduction technique. The load regulation circuit 504 may also include other components for maintaining a desired quality of operation of the discrete-spectrum light source 506. For example, the load regulation circuit 504 may include a controllable-impedance circuit (e.g., a linear regulator).

A second load regulation circuit (LRC) 508 and a second discrete-spectrum light source 510 may operate in a manner similar to the first load regulation circuit 504 and the first discrete-spectrum light source 506, although the second discrete-spectrum light source 510 may be configured to emit a different color temperature of light than the first discrete-spectrum light source 506. One of the discrete-spectrum light sources, such as the first discrete-spectrum light source 506, may be configured to emit a relatively warm (e.g., red) color temperature light, for example on the order of 1,000-2,000 K. The other discrete-spectrum light source, such as the second discrete-spectrum light source 510, may be configured to emit a relatively cold (e.g., blue) color temperature light, for example on the order of 10,000 K. Depending on the desired color temperature of the combined/composite light source (e.g., the combination of the first discrete-spectrum light source 506 and the second discrete-spectrum light source 510), the intensities of one or more of the first discrete-spectrum light source 506 or the second discrete-spectrum light source 510 may be adjusted (i.e., dimmed and/or increased).

As a result, the color temperature of the composite light emitted from the first discrete-spectrum light source 506 or the second discrete-spectrum light source 510 may be controlled. For example, by decreasing the intensity of the first discrete-spectrum light source 506 and/or by increasing the intensity of the second discrete-spectrum light source 510, the composite light emitted may be made to appear to have a higher color temperature than previously emitted (e.g., the light appears bluer or cooler). Similarly, by decreasing the intensity of the second discrete-spectrum light source 510 and/or by increasing the intensity of the first discrete-spectrum light source 506, the composite light emitted may be made to appear to have a lower color temperature than previously emitted (e.g., the light appears redder or warmer).

The first discrete-spectrum light source 506 and the second discrete-spectrum light source 510 may be included in the same lighting fixture, for example so that the composite light emitted from the lighting fixture may be tuned to a desired color temperature. The controllable-color-temperature lighting load may include a single power converter (e.g., rather than a power converter in each load regulation circuit 504, 508) for generating a single DC bus voltage. The load regulation circuits 504, 508 may each comprise an LED drive circuit for receiving the DC bus voltage and controlling the respective discrete-spectrum light source 506, 510.

In an example, the discrete-spectrum light sources 506 may be integrated into the same device (e.g., a screw-in lamp) or may be separate devices. For example, the discrete-spectrum light sources 506, 510 may be included in two fixtures that are in the vicinity of each other. In an example, the load control system 500 may be a separate device that is attached to the discrete-spectrum light sources 506, 510. For example, the load control system 500 may be mounted to a lighting fixture and electrically connected to the discrete-spectrum light sources 506, 510. In an example, load control system 500 and the discrete-spectrum light sources 506, 510 may each be included in a single light fixture. Although two light sources may be illustrated in FIG. 5B, more than two light sources may be utilized, for example to achieve more granular control over color temperature and/or composite light intensity.

For example, if the control circuit 502 controls the first load regulation circuit 504 to decrease the intensity of the first discrete-spectrum light source 506 (e.g., the redder light source) while maintaining a constant intensity of the second discrete-spectrum light source 510, the combined light emitted from the first discrete-spectrum light source 506 and the second discrete-spectrum light source 510 may become cooler in nature (e.g., more blue). Conversely, if the control circuit 502 controls the second load regulation circuit 508 to decrease the intensity of the second discrete-spectrum light source 510 (e.g., the bluer light source) while maintaining a constant intensity of the first discrete-spectrum light source 506, the combined light emitted from the first discrete-spectrum light source 506 and the second discrete-spectrum light source 510 may be warmer in nature (e.g., more red). The control circuit 502 may be configured to control the first load regulation circuit 504 and/or the second load regulation circuit 508 in order to adjust the intensity of the first discrete-spectrum light source 506 to a first intensity level (i.e., a first dimming level) and/or to adjust the intensity of the second discrete-spectrum light source 510 to a second intensity level (i.e., a second dimming level) in order to achieve a desired color temperature and/or a desired overall intensity level of the composite light.

The control circuit 502 may be operably coupled to a communication circuit 512. The communications circuit 512 may include one or more of a receiver, a transmitter, a radio frequency (RF) transceiver, and/or other communications module(s) capable of performing wired and/or wireless communications via communications port 514. For example, the control circuit 502 may be configured to communicate with other controllable-color-temperature lighting loads and/or a system controller via the communications circuit 512. The communications may be analog and/or digital signals. The communications may include information regarding the state information applicable to one or more of the control circuit 502, the first load regulation circuit 504, the first discrete-spectrum light source 506, the second load regulation circuit 508, and/or the second discrete-spectrum light source 510. The communications may include information regarding the state of other controllable-color-temperature lighting loads and/or of the system controller. The communications may include commands from one or more of the system controller and/or other controllable-color-temperature lighting loads. The commands may instruct the control circuit 502 to adjust the intensities of one or more of the discrete-spectrum light sources 506, 510, for example to achieve a desired composite color temperature level. For example, the communications received by the communication circuit 512 may be an analog signal, for example ranging from 0-10 V (e.g., where 0 V may represent the lamp being turned off, 10 V may represent full power, and linear interpolation may be used by the control circuit 502 to determine power levels associated with the intervening range) and/or may be a digital control signal where discrete power levels/addresses are signaled to the load regulation circuit 504 (e.g., to be used with a digital-to-analog (DAC) converter).

The control circuit 502 may store information in and/or retrieve information from a memory 516. For example, the memory 516 may store information related to other controllable-color-temperature lighting loads and/or information communicated to/from a system controller. The memory 516 may include a non-removable memory and/or a removable memory. The memory 516 may be non-transitory memory (e.g., tangible memory) that is configured to store computer executable instructions to be performed and/or executed by the control circuit 502 in order to affect the color temperature of the composite light emitted by the discrete-spectrum light sources 506, 510. Although each of the communication circuit 512, the load regulation circuits 504, 508, and the memory 516 are shown to be individually coupled to the control circuit 502, various architectures may be utilized for exchanging information and otherwise communicating between the various components of the controllable-color-temperature load control system 500

In an example, once a specified color temperature has been achieved (e.g., a first intensity value has been determined for the discrete-spectrum light source 506 and a second intensity value has been determined for the discrete-spectrum light source 510 such that the combined emissions from the discrete-spectrum light source 506 and the discrete-spectrum light source 510 are at the specified color temperature), it may be desirable to dim the combined light output (e.g., decrease the total intensity of light emitted at the specified color temperature) without changing the specified color temperature. To achieve the dimming without changing the color temperature, each of the discrete-spectrum light source 506 and the discrete-spectrum light source 510 may be further dimmed while still maintaining a specified dimming ratio between the discrete-spectrum light source 506 and the discrete-spectrum light source 510. For example, suppose that a desired color temperature may be achieved by dimming discrete-spectrum light source 506 to a 50% dimming level and by dimming discrete-spectrum light source 510 to a 25% dimming level. To decrease the overall intensity of the light emitted at the desired color temperature while still ensuring the emitted light is at approximately the desired color temperature, discrete-spectrum light source 506 may be dimmed to a 25% dimming level and discrete-spectrum light source 510 may be dimmed to a 12.5% dimming level. Thus, the ratio of the dimming level of discrete-spectrum light source 506 to the dimming level of discrete-spectrum light source 510 may be maintained (e.g., 2 to 1) so that the emitted color temperature may remain approximately the same (e.g., albeit at a lower overall intensity).

In an example, the controllable-color-temperature lighting load 530 may be configured to imitate the dimming properties of a continuous-spectrum light source. For example, if the first discrete-spectrum light source 506 is emitting light at a relatively warm color temperature and the second discrete-spectrum light source 510 is emitting light at a relatively cool color temperature, then to imitate the dimming effect of a black body radiator the control circuit 502 may be configured to first adjust the intensity of the second discrete-spectrum light source 510 (e.g., the bluer light source) in order to vary the overall composite intensity level of the controllable-color-temperature lighting load 530. In this manner, if the bluer discrete-spectrum is dimmed while the redder light source remains at a relatively constant intensity level, the overall composite intensity of the controllable-color-temperature lighting load 530 may be decreased (e.g., dimmed) and the composite color temperature of the emitted light may become redder due to the increased relative contribution of the redder light source to the composite light emissions. Similarly, if the bluer discrete-spectrum is brightened while the redder light source remains at a relatively constant intensity level, the overall composite intensity of the controllable-color-temperature lighting load 530 may be increased (e.g., brightened) and the composite color temperature of the emitted light may become bluer due to the increased relative contribution of the bluer light source to the composite light emissions. Such effects may mimic the natural dimming effects of a continuous-spectrum light source.

Figure 6:
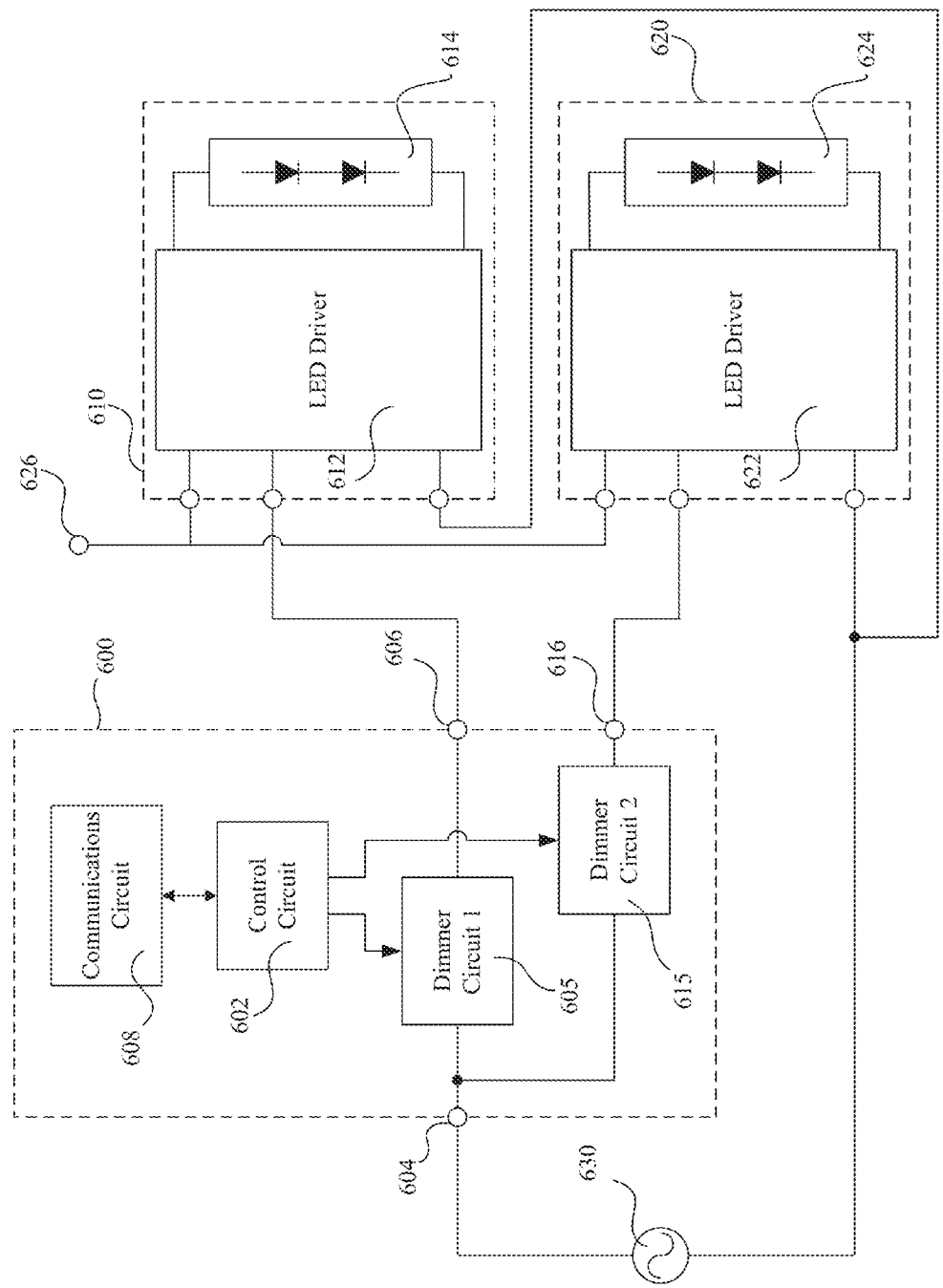
FIG. 6 depicts an example a controllable-color-temperature lighting load that utilizes two or more LED lamps.

FIG. 6 illustrates an example a controllable-color-temperature lighting load for controlling using two or more LED light sources. Although two LED light sources (e.g., a first LED light source 610 and a second LED light source 620) are shown in FIG. 6, more than two LED light sources may be used. In an example, a controllable-color-temperature (CCT) load control device 600 may include a hot terminal 604 that is coupled to an AC power source 630. When used herein, the terms CCT load control device/circuit/system, color temperature load control device/circuit/system, load control device/circuit/system for controlling color temperature, load control device/circuit/system for a CCTLL, etc. may be used to describe one or more elements used to control the intensity level (e.g., dimming level) of one or more light sources (e.g., discrete-spectrum light sources) in order to vary the color temperature of the composite light emitted by the one or more light sources. For example, the CCT load control device 600 may include two dimmed hot terminals (e.g., a first dimmed hot terminal 606 and a second dimmed hot terminal 616) for controlling the two LED light sources. As may be appreciated, there may be a dimmed hot terminal for each LED light source under the control of the CCT load control device 600.

The CCT load control device 600, the first LED light source 610, and the second LED light source 620 may be components of an example LED-driven CCTLL. Various types of LEDs may be utilized. For example, LEDs that emit light at different color temperatures may be used. In an example, one or more "tunable white" LEDs may be used. A tunable white LED may emit light white a relatively white color temperature, but may also be "tuned" or adjusted to emit light at different color temperatures in addition to the white light. For example, a tunable white LED may emit light in a color temperature range from 2,700 K to 6,500 K, although other ranges may be used. The CCT load control device 600 may comprise a control circuit 602 for controlling a first dimmer circuit 605 to generate a first dimmed hot voltage at the first dimmed hot terminal 606. The CCT load control device 600 may comprise a second dimmer circuit 615 to generate a second dimmed hot voltage at the second dimmed hot terminal 616. The control circuit 602 may include one or more general purpose processors, special purpose processors, conventional processors, digital signal processors (DSPs), microprocessors, microcontrollers, integrated circuits, a programmable logic device (PLD), application specific integrated circuits (ASICs), or the like. The control circuit 602 may include memory (e.g., tangible memory) for storing computer executable instructions to be performed by one or more processors included in the control circuit 602.

For purposes of description, the example described with respect to FIG. 6 may be explained using example analog control signals (e.g., using phase control signals), but digital control signals may also be used. For example, rather than or in addition to providing the LED light sources with an analog signal for controlling the LED light sources, the CCT load control device 600 may utilize digital signals to control the LED light sources 610, 620. The control circuit 602 may be operably coupled to a communication circuit 608, which may provide operable communications between the CCT load control device 600, and one or more of other controllable-color-temperature lighting loads, a system controller, and/or various sensing equipment (e.g., an occupancy sensor, a daylight sensor, a color temperature sensor, and/or the like).

The dimmed hot terminal 606 may be coupled to a first load (e.g., the first LED light source 610), and the dimmed hot terminal 616 may be coupled to a second load (e.g., the second LED light source 620). The first LED light source 610 may comprise an LED driver 612 and an LED light engine 614, and the second LED light source 620 may comprise an LED driver 622 and an LED light engine 624. The first LED light source 610 may be coupled to the first dimmed hot terminal 606 and the neutral connection of the AC power source 630. The second LED light source 620 may be coupled to the second dimmed hot terminal 616 and the neutral connection of the AC power source 630. The CCT load control device 600 may be operable to provide a first dimmed hot voltage (e.g., a first phase control signal) to the first LED light source 610 for controlling the intensity of the LED light engine 614. The CCT load control device 600 may be operable to provide a second dimmed hot voltage (e.g., a second phase control signal) to the second LED light source 620 for controlling the intensity of the LED light engine 624. The first LED light source 610 may operate at a first color temperature (e.g., a cooler color temperature, for example in excess of 10,000 K), and the second LED light source 620 may operate at a second color temperature (e.g., a warmer color temperature, for example in the approximate range of 1,000-3,000 K). By controlling the intensities of the first LED light source 610 and the second LED light source 620, the CCT load control device 600 may vary the combined output of the first LED light source 610 and the second LED light source 620 to be a specified value between the first color temperature and the second color temperature.

The CCT load control device 600 may be operable to provide the dimmed hot voltages using different types of phase control (e.g., forward phase control, reverse phase control, etc.). In addition, the CCT load control device 600 may be operable to provide a full conduction voltage to one or more of the LED light source 610 and/or LED light source 620. The CCT load control device 600 may include one or more control actuators (e.g., tap switches) for turning the LED light engine 614 on and off, for turning LED light engine 624 on or off, and/or for turning both LED light engine 614 and LED light engine 624 on or off at the same time. In an example, in addition to automatically controlling the intensity levels of the LED light source 610 and the LED light source 620 based on commands received from a system controller and/or inputs from various sensing devices, the CCT load control device 600 may also include one or more intensity adjustment actuators (e.g., dimming rockers). The intensity adjustment actuators may be used to adjust the intensity of the first LED light engine 614, the second LED light engine 624, and/or both of the first and second LED light engines 614, 624 at the same time.

The LED driver 612 and/or the LED driver 622 may be configured to provide power to various LED light engines. For example, the LED driver 612 and the LED driver 622 may be operably coupled to an alternating-current (AC) line voltage 626 used to supply power for illuminating the LED light engines 614, 624. The line voltage may be supplied by the CCT load control device 600 and/or may be separately configured connection with power source such as the AC power source 630. The different LED light engines may be rated to operate using different load control techniques, different dimming techniques, and/or different magnitudes of load current and/or load voltage. The LED driver 612 and/or the LED driver 622 may be operable (e.g., controllable via the CCT load control device 600) to control the load current through an LED light engine and/or the load voltage across an LED light engine.

In an example, the LED driver 612 and/or the LED driver 622 may be configured to utilize a current load control mode (e.g., control the magnitude of the current provided to the LED light engine) and/or a voltage load control mode (e.g., control the magnitude of the voltage provided to the LED light engine). For example, in current load control mode, the LED driver 612 and/or the LED driver 622 may control the intensity of the LED light engine (e.g., the LED light engine 614 and/or the LED light engine 624, respectively) using a pulse-width modulation dimming technique and/or using a constant current reduction (CCR) dimming technique. When operating in voltage load control mode, the LED driver 612 and/or the LED driver 622 may control the intensity of the LED light engine (e.g., LED light engine 614 and/or LED light engine 624, respectively) using a pulse-width modulation dimming technique.

The LED driver 612 and/or the LED driver 622 may each include a radio-frequency interference (RFI) filter and rectifier circuit for minimizing the noise inherent in the AC power source 630 and for generating a rectified voltage from the dimmed hot terminals. The LED driver 612 and/or the LED driver 622 may each include a power converter (e.g., a buck-boost flyback converter, a flyback converter, a buck converter, a single-ended primary-inductor converter (SEPIC), a Ćuk converter, or other suitable power converter) to generate a variable direct-current (DC) bus voltage. The power converter may provide isolation between the AC power source 630 and the LED loads (e.g., the LED light engine 614 and/or the LED light engine 624). The power converter may adjust the power factor of the LED driver to be close to one (e.g., appear as a near-entirely resistive load).

The LED driver 612 and/or the LED driver 622 may each include an LED drive circuit. The LED drive circuit may receive the bus voltage and may control the amount of power delivered to the respective LED light engine (e.g., LED light engine 614 or LED light engine 624). The LED drive circuit may include a controllable-impedance circuit (e.g., a linear regulator, a switching regulator, a buck converter, etc.) for controlling the intensity of the respective LED light engine. The LED driver 612 and/or the LED driver 622 may each include a control circuit for controlling the operation of the power converter and/or the LED drive circuit. The control circuit may receive commands from the CCT load control device 600. In an example, the CCT load control device 600 may directly control the power converters and/or LED drive circuits included in the LED driver 612 and/or the LED driver 622. The LED driver 612 and/or the LED driver 622 may each include a power supply for powering the circuitry of LED drivers.

The LED driver 612 and/or the LED driver 622 may each include a phase-control input circuit for generating a target intensity control signal. The target intensity control signal may comprise, for example, a square-wave signal with a duty cycle that is dependent upon the conduction period of a phase-control signal received from the CCT load control device 600. The target intensity signal may be representative of the target intensity of LED light engine being controlled. In an example, the target intensity control signal may comprise a DC voltage having a magnitude dependent on the conduction period of the phase-control signal received from the CCT load control device 600, and may be representative of the target intensity of LED light engine being controlled. However, other types of control signaling may be utilized.

As an example, the LED light source 610 may be configured to operate at a relatively high color temperature, for example around 10,000 K (e.g., a blue light source). The LED light source 620 may be configured to operate at a relatively low color temperature, for example around 2,000-3,000 K (e.g., a red light source). If it is determined that the combined light source is to operate at a high color temperature, the CCT load control device 600 may increase the intensity of the LED light source 610 and/or decrease the intensity of the LED light source 620 until the desired composite color temperature is achieved.

The CCT load control device 600 may be preconfigured with known dimming value combinations for the LED light sources 610, 620 that will result in various color temperatures. For example, the CCT load control device may include a state table that indicates a composite color temperature that will be emitted from the LED light sources 610, 620 based on the dimming/intensity levels utilized the LED light sources 610, 620. For example, the CCT load control device may determine that a first color temperature may be achieved when the first LED light source 610 is operating at a first intensity level and the second LED light source 620 is operating a second intensity level. By adjusting one or more of the first intensity level or the second intensity level, the resultant color temperature may be adjusted. For example, increasing the second intensity level at the second LED light source 620 may result in a redder or lower color temperature composite light.

The CCT load control device 600 may utilize feedback in order to determine the current composite color temperature of the LED light sources 610, 620. For example, a color temperature sensor may be used to determine the color temperature of the composite light being emitted by the LED light sources 610, 620 and may feedback the sensor information to the CCT load control device. The CCT load control device 600 may use the color temperature sensor data to adjust the intensity levels of one or more of the LED light sources 610, 620 until a desired color temperature is achieved.

Figure 7A:
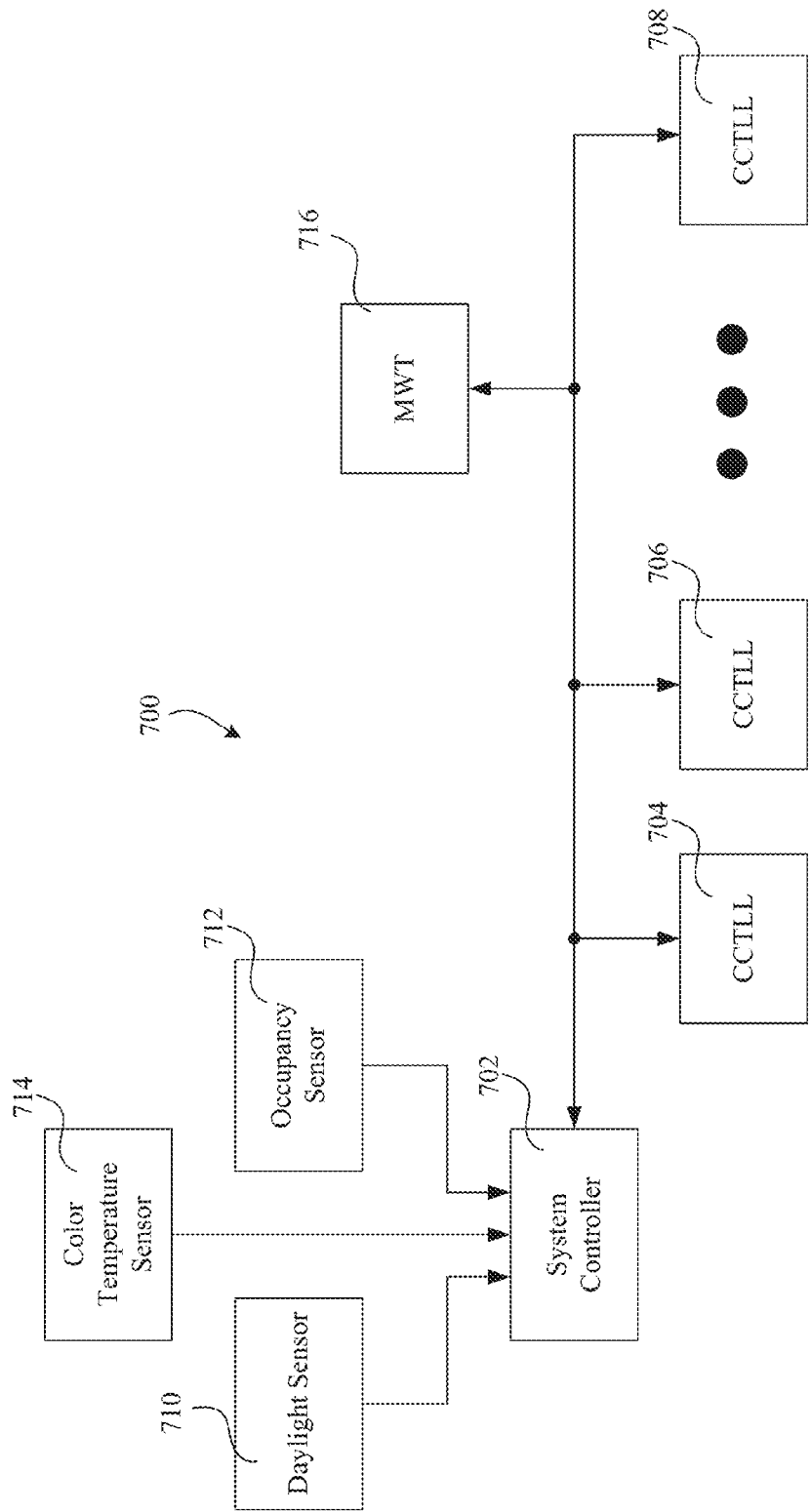
FIG. 7A depicts an example system where multiple controllable-color-temperature lighting loads may be in communication with a system controller.

FIG. 7A illustrates an example system where multiple controllable-color-temperature lighting loads may be in communication with a system controller. For example, a color temperature controllable lighting system 700 may include a system controller 702. The system controller 702 may be configured to communicate with one or more of a controllable-color-temperature lighting loads (CCTLLs) 704, 706, 708. Although three CCTLLs are shown in FIG. 7, more or fewer CCTLLs may be utilized. The communications may be wired and/or wireless communications and may be comprised of analog and/or digital signals. The system controller 702 may send commands to one or more of the CCTLLs 704, 706, 708 that indicate the appropriate color temperature that the respective CCTLL should operate at (or otherwise control the respective CCTLL in order to cause it to operate at the desired color temperature). For example, the command may indicate an amount by which the CCTLL should dim one or more light sources included in the CCTLL. The command may indicate a desired color temperature for a respective CCTLL, and the CCTLL may determine the appropriate adjustment to the intensity of a given light source in order to achieve the desired color temperature.

The system controller 702 may act as a control node for the CCTLLs in an area and/or for other controllable equipment in a given area. For example, the system controller 702 may receive various sensor data and/or feedback information from the CCTLLs. The system controller 702 may be configured to determine the appropriate color temperature for the CCTLLs and/or the appropriate settings for other controllable equipment in the area (e.g., shades, non-CCTLL lighting equipment, temperature settings, control of climate control equipment such as air conditioners and heaters, control of security equipment, control of appliances and/or electronics in an area, etc.). The system controller 702 may include a user interface for receiving user preferences or for establishing default settings. The system controller 702 may determine the appropriate color temperature for one or more CCTLLs based on environmental criteria (e.g., sensor readings, current time, inputs from media/media devices, etc.) and/or user settings or preferences (e.g., a desired color temperature level, a desired room temperature level, the indicated use of the room, etc.). The system controller 702 may infer based on settings and/or sensor readings when and how to automatically (e.g., without direct input from a user) change the color temperature of one or more CCTLLs in a given area.

As an example, the system controller 702 may determine to operate the CCTLL 704 at 2,000 K, the CCTLL 706 at 4,000 K, and the CCTLL 708 at 7,000 K. The system controller 702 may send a digital message to the CCTLL 704 indicating that the CCTLL 704 should operate at 2,000 K. In an example, the system controller 702 may send a command to the CCTLL 704 that indicates the amount by which the CCTLL 704 should adjust the intensities of one or more light sources included in CCTLL 704. For example, the command may be similar to a phase-control signal sent from a dimmer switch. In another example, the command may be a digital command. The system controller 702 may send similar commands to the CCTLL 706 and the CCTLL 708 in order to instruct them to operate at 4,000 K and 7,000 K, respectively.

The CCTLLs 704, 706, 708 may each include a communication circuit configured to communicate with other CCTLLs and/or the system controller 702. The CCTLLs 704, 706, 708 may each also include two or more light sources. The two or more light sources may be discrete-spectrum light sources (e.g., LED light engines) that are associated with two or more different color temperatures. The two or more light sources may include a continuous-spectrum light source such as an incandescent lamp or a halogen lamp. The CCTLLs 704, 706, 708 may each also include a CCT load regulation system such as two or more load regulation circuits to control the respective light sources. The CCT load regulation systems of CCTLLs 704, 706, 708 may each also include a control circuit configured to interpret commands received from the system controller 702 and/or other CCTLLs and to implement the commands by controlling the intensity of the two or more light sources, for example using the two or more load regulation circuits.

The system controller 702 may also be in communication with a daylight sensor 710, an occupancy sensor 712, and/or a color temperature sensor 714. Although the daylight sensor 710, the occupancy sensor 712, and the color temperature sensor 714 are shown in FIG. 7, other types of sensors may also be utilized. For example, the system controller 702 may be operably coupled to one or more of a motion sensor, a vacancy sensor, a time clock, a calendar, a weather sensor, a location sensing device (e.g., Global Positioning System (GPS)), a media device (e.g., computer, smartphone, tablet, television, music player, camera), a shadow sensor, a light intensity sensor, a temperature sensory, a smoke detector, a Carbon Dioxide ($CO_2$) sensor, and/or the like. The system controller 702 may be configured to interpret the information received from one or more sensors (e.g., such as the daylight sensor 710, the occupancy sensor 712, the color temperature sensor 714, and/or any other sensors) to determine an appropriate color temperature for the CCTLLs 704, 706, 708. In addition, the controller 702 may also be in communication with a manual input device, such as, a keypad or remote control device having a user interface (e.g., including one or more actuators) for receiving a user input.

For example, the occupancy sensor 712 may be configured to provide an indication to the system controller 702 when one or more persons are present in a given room or space. A characteristic of discrete-spectrum light sources may be that they operate more efficiently (e.g., produce more lumens per watt) when operating at a higher color temperature (e.g., bluer) than at a lower color temperature (e.g., redder). The more efficient operation may be due to fewer losses during the Stokes shift to a lower frequency. However, bluer light may also be less aesthetically pleasing to the human eye. Therefore, during periods wherein the occupancy sensor 712 indicates that the room or space (in which the CCTLL 704, the CCTLL 706, and/or the CCTLL 708 is installed) is occupied, the system controller 702 may be configured to control the CCTLL 704, the CCTLL 706, and/or the CCTLL 708 such that the corresponding light sources operate at a redder color temperature (e.g., in order to operate in an aesthetically pleasing manner). During periods when the occupancy sensor 712 indicates that the room or space is not occupied, the system controller 702 may be configured to control the CCTLL 704, the CCTLL 706, and/or the CCTLL 708 to operate the light sources using a bluer temperature (e.g., in order to operate more efficiently).

In an example, the daylight sensor 710 may be configured to provide an indication to the system controller 702 regarding the approximate amount of ambient light that is detected by the daylight sensor 710. The daylight sensor 710 may provide an indication of the total intensity of light detected, an indication of the relative intensity of light in a given bandwidth (e.g., the visible light spectrum), and/or the like. The system controller 702 may receive the information regarding the amount of ambient light from the daylight sensor 710 and may adjust the light sources of one or more of the CCTLLs 704, 706, 708 based on the information. For example, the system controller 702 may control each of the CCTLLs 704, 706, 708 to adjust the total intensity of light emitted from each CCTLL without changing the specified color temperature of each CCTLL (e.g., by maintaining a specified dimming ratio between the light sources of each CCTLL) in response to the daylight sensor 710. For example, the daylight sensor 710 may be used to feedback overall light intensity information to the system control 702 such that the system controller 702 adjusts the overall intensity of the light emitted from the CCTLLs 704, 706, 708 while maintaining relatively constant color temperatures and/or a ratio of color temperatures across the CCTLLs 704, 706, 708.

In an example, since daylight may be associated with a relatively high color temperature (e.g., on the order of 5,000-10,000 K), during periods where daylight is detected by the daylight sensor 710, the system controller 702 may be configured to instruct one or more of the CCTLLs 704, 706, 708 to operate at a relatively high color temperature. By matching the output from one or more of the CCTLLs 704, 706, 708 to that of daylight, a more aesthetically pleasing appearance may be achieved. During periods were little or no daylight is detected, the system controller 702 may be configured to instruct one or more of the CCTLLs 704, 706, 708 to operate using a relatively low color temperature (e.g., redder). Such a lower color temperature may be more aesthetically pleasing to the human eye in the absence of other light sources such as daylight.

In an example, the color temperature sensor 714 may be configured to measure the color temperature of the ambient light received by the color temperature sensor and to provide an indication to the system controller 702 regarding the relative intensity of light at a given color temperature. The color temperature sensor 714 may indicate the determined color temperature of the ambient light to the system controller 702 in order for the system controller 702 to determine the color temperature of operation for one or more of the CCTLLs 704, 706, 708. For example, the system controller 702 may attempt to match the color temperature of one or more of the CCTLLs 704, 706, 708 with the color temperature of the ambient light detected by the color temperature sensor 714. In an example, the color temperature sensor 714 (or another color temperature sensor) may be used to measure the color temperature of light emitted by one or more of the CCTLLs 704, 706, 708, for example to provide feedback regarding the operation of the CCTLLs 704, 706, 708 to the system controller 702.

As an example of operation of the color temperature controllable lighting system 700, if it is an overcast day, the color temperature sensor 714 may detect a color temperature of approximately 7,000 K for ambient light. The system controller 702 may use this information to instruct one or more of the CCTLLs 704, 706, 708 to adjust the intensities of one or more of their respective light sources in order to achieve a color temperature of approximately 7,000 K to be emitted from the CCTLL 704, the CCTLL 706, and/or the CCTLL 708. By matching the color temperature to that of the ambient light outside the building, not only can a more aesthetically pleasing environment be created inside the building, but also the building may blend in more with the surroundings and may attract less attention from persons on the outside of the building when the color temperature inside the building matches that of the light outside. Thus, a benefit of additional privacy can be achieved since what is happening inside the building may not stand out as much to an observer outside the building.

Moreover, due to the differing effects that warm versus cool color temperatures can have on humans, the color temperature of lights within a space or room may be varied in order to achieve a desired effect. For example, studies have shown that cognitive tasks such as reading may benefit from utilizing relatively cooler, bluer light. Thus, for classroom or work settings, it may be desirable to achieve a relatively high color temperature for the overall room. Thus, in addition to any available daylight, the CCTLLs within a classroom or work setting may be set to a relatively high color temperature. However, for more creative works such a painting or other artistry, some studies have shown that a warmer, redder light source is more beneficial. Thus, for studios or other creative settings, the CCTLLs may be set to a relatively low color temperature.

The system controller 702 may also be in communication with one or more daylight control devices, for example, a motorized window treatment 716. The motorized window treatment (MWT) 716 may be positioned in front of a window for controlling the amount of daylight (e.g., natural light) entering the building. The motorized window treatment 716 may be opened to allow more daylight to enter the building and may be closed to allow less daylight to enter the building. The motorized window treatment 716 may comprise one or more of a roller shade, a drapery, a roman shade, a cellular shade, a venetian blind, and/or a skylight shade. Examples of motorized window treatments are described in commonly-assigned U.S. Pat. No. 6,983,783, issued Jan. 10, 2006, entitled MOTORIZED SHADE CONTROL SYSTEM, and/or U.S. Patent Application Publication No. 2012/0261078, published Oct. 18, 2012, entitled MOTORIZED WINDOW TREATMENT, the entire disclosures of which are hereby incorporated by reference. In an example, the system controller 702 may be in communication with other types of daylight control devices, such as, for example, one or more of controllable window glazings (e.g., electrochromic windows), controllable exterior shades, and/or controllable shutters or louvers.

Figure 7B:
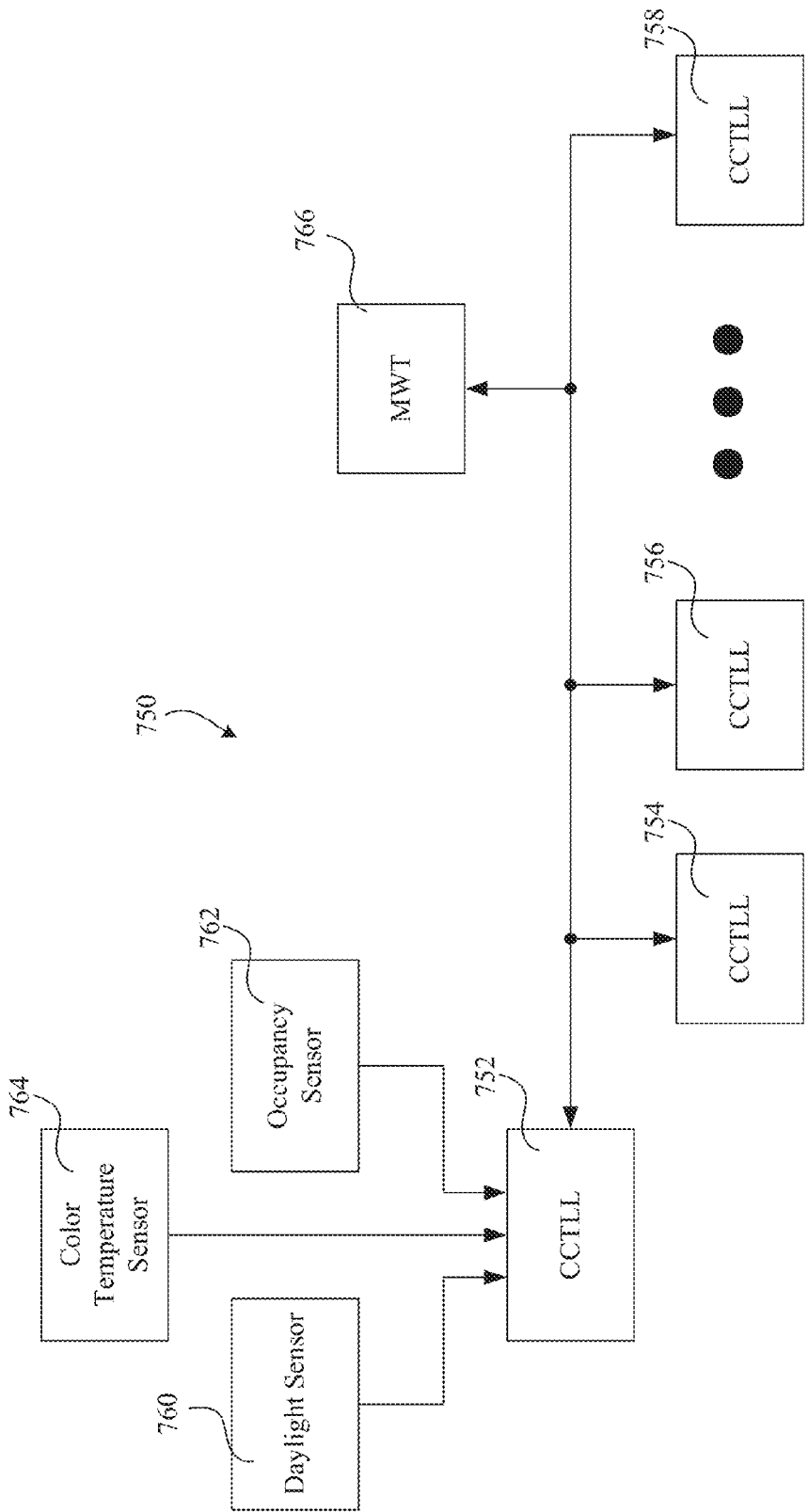
FIG. 7B depicts an example system utilizing a plurality of controllable-color-temperature lighting loads interacting in an ad hoc manner.

FIG. 7B illustrates an example where one or more CCTLLs may operate in a relatively autonomous or ad hoc manner (e.g., without the use of a dedicated system controller). For example, CCTLLs 752, 754, 756, 758 may be co-located in a room or common space. The CCTLLs 752, 754, 756, 758 may be configured to communicate with each other, or the CCTLLs 752, 754, 756, 758 may be configured to operate wholly autonomously (e.g., without communicating with other CCTLLs and/or without interaction between the different CCTLLs when setting the operational color temperatures).

One or more of the CCTLLs 752, 754, 756, 758 may be operably coupled to one or more sensors. For example, CCTLL 752 may be coupled to and receive input data from a daylight sensor 760, an occupancy sensor 762, and/or a color temperature sensor 764. Although not shown in FIG. 7B, one or more of the CCTLLs 754, 756, 758 may be configured to utilize the same sensors as the CCTLL 752 and/or may be configured to use its own sensors. The CCTLLs 752, 754, 756, 758 may communicate with a motorized window treatment (MWT) 766 in order to adjust the operation of the motorized window treatment 766 and/or to take into account the current state of the motorized window treatment 766 when determining the appropriate CCTLL color temperature state.

The CCTLL 752 may use the information received from one or more sensors (e.g., the daylight sensor 760, the occupancy sensor 762, the color temperature sensor 764, and/or the like) to adjust its color temperature setting. For example, the CCTLL may be configured to match the color temperature of ambient light as detected by the color temperature sensor 764. If the color temperature sensor 764 indicates that the color temperature of the ambient light has increased (e.g., become bluer), the CCTLL 752 may respond by increasing the intensity of a relatively blue light source and/or by decreasing the intensity of a relatively red light source. The amount by which the CCTLL 752 increases the intensity of a relatively blue light source and/or decrease the intensity of a relatively red light source may depend on one or more of the amount of change in color temperature to be achieved, the nominal color temperature of the bluer light source, the nominal color temperature of the redder light source, the relative proximity of the desired color temperature relative the nominal color temperature of the bluer light source/redder light source, and/or the like.

Figure 7C:
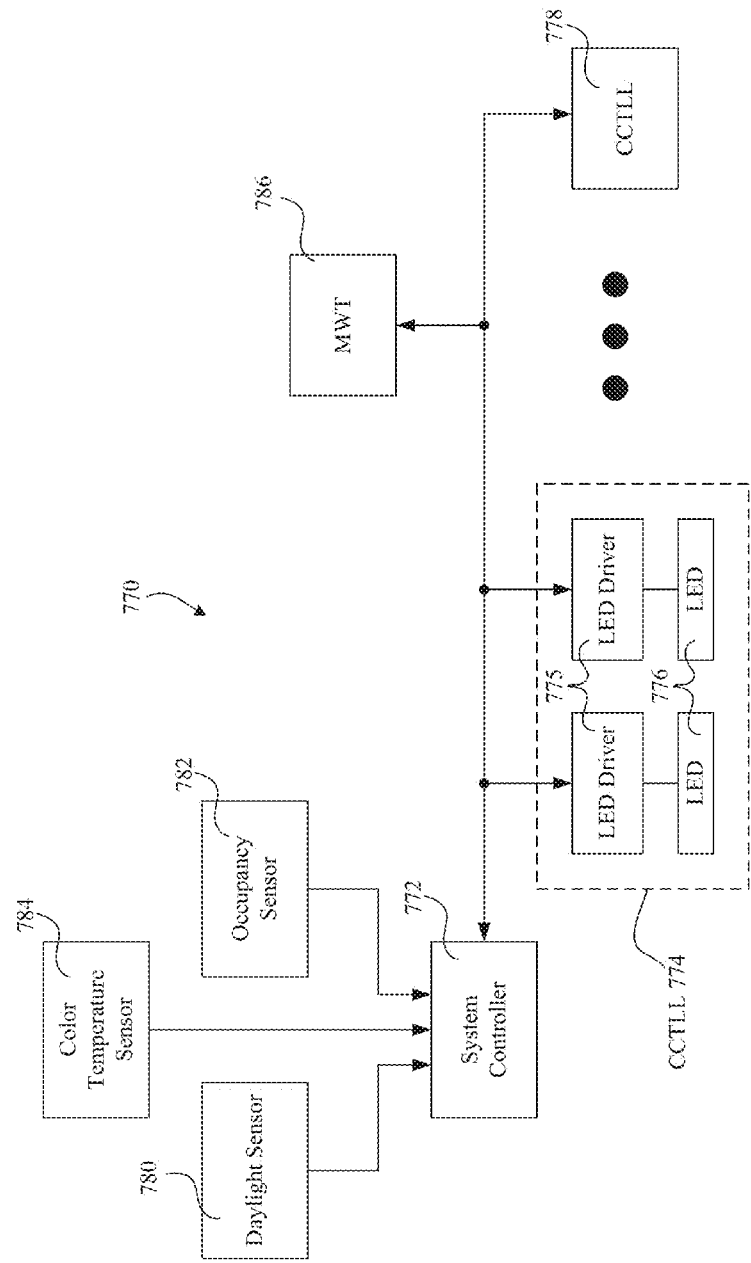
FIG. 7C depicts an example system that utilizes a controllable-color-temperature lighting load including two LED lamps installed in a single lighting fixture.

FIG. 7C illustrates an example system that utilizes a dual-LED driven CCTLL. For example, a system 770 may include a CCTLL 774. The CCTLL 774 may include two or more LED drivers 775 configured to power two or more LED light engines 776. As an example, the CCTLL 774 may be implemented using similar components as were described in FIG. 6. The load control system for the CCTLL 774 may be included at the CCTLL 774 and/or may be included at a system controller 772. The system controller 772 may adjust the composite color temperature of the CCTLL 774 based on inputs received from a daylight sensor 780, a color temperature sensor 784, an occupancy sensor 782, another CCTLL (e.g., a CCTLL 778), a motorized window treatment (MWT) 786, other sensors, and/or the like. Control signals for adjusting a particular, individual LED may be individually sent to the CCTLL 774 (e.g., the system controller 772 sends individual digital or analog commands for adjusting a specific LED intensity) and/or the a single command may be sent that causes the CCTLL 774 to adjust the intensity of multiple LEDs (e.g., the System Controller 772 indicates a given color temperature value to the CCTLL 774 and the CCTLL 774 determines how to individually adjust each of the LEDs based on the command).

In an example, each of the CCTLLs within a given room may all be set to approximately the same color temperature. For example, the color temperature may be set to that of the ambient daylight (e.g., as measured by a color temperature sensor/daylight sensor located near a window) and/or some other color temperature. For example, FIG. 8 may represent a cross-section of an example room including one or more CCTLLs. For example, a room 800 may include one or more window(s) 802, which may be located on one side of the room. Although the room 800 is shown to have the window(s) 802 on a single wall in FIG. 8, other walls may also include windows.

Figure 8:
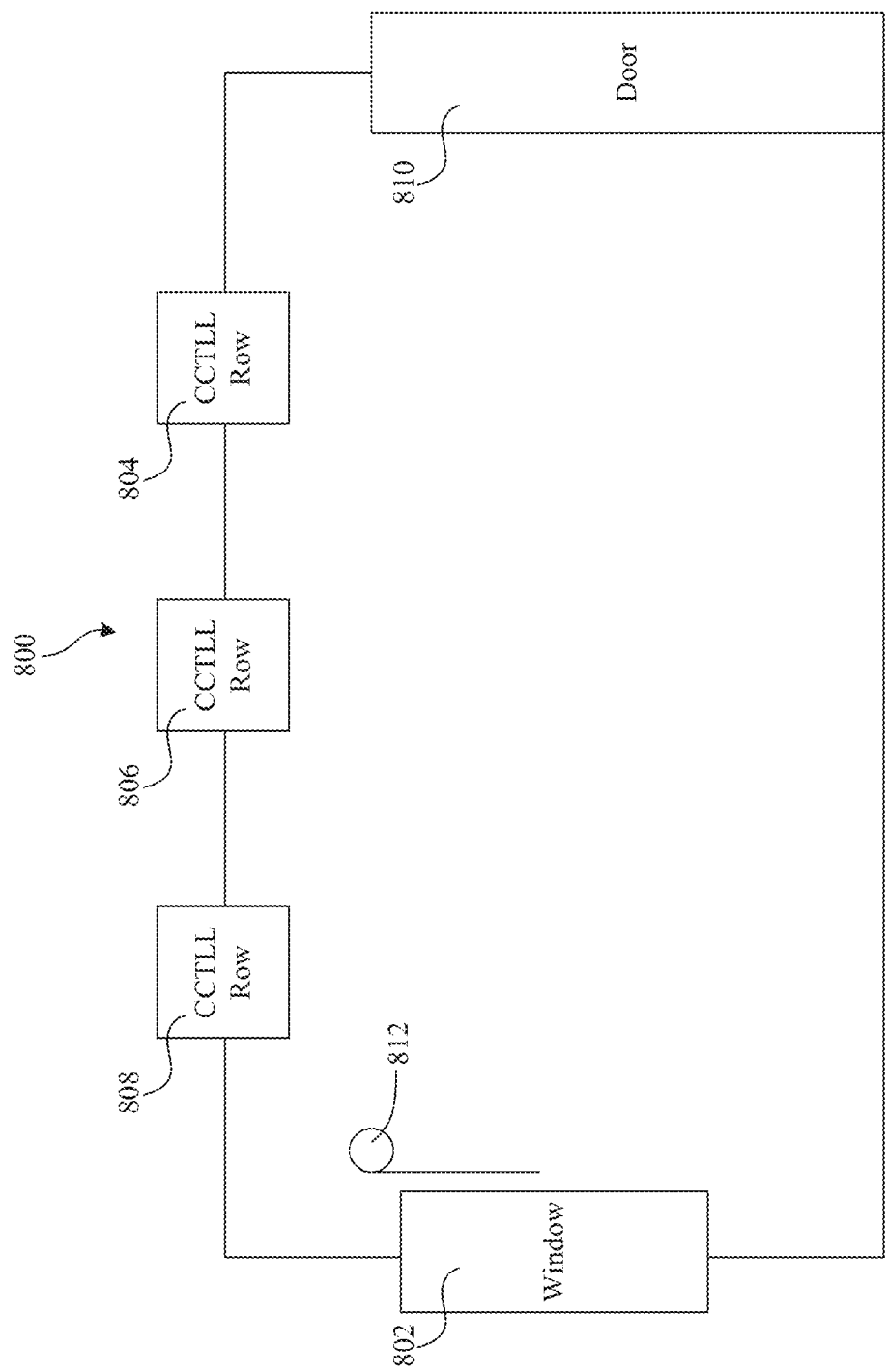
FIG. 8 depicts a cross-section of an example room including one or more CCTLLs.

Additionally, one or more rows of CCTLLs may be included on the ceiling of the room 800. As may be appreciated, although three rows of CCTLLs are shown in FIG. 8, more or fewer rows may be utilized. Additionally, although examples may be described in terms of controlling rows of CCTLLs together, respective CCTLLs within a given CCTLL row may be controlled individually. For example, if additional windows are included on a wall perpendicular to the wall containing the window 802, it may be desirable to individually control CCTLLs included in a given CCTLL row in order to achieve a desired effect (e.g., maintaining a desired level of color temperature within room 800). Further, rather than or in addition to rows of CCTLLs, various geometric arrangements of CCTLLs may be used to outfit a room. The manner used to control the color temperature operation of the CCTLL arrangements may depend of the geometric arrangement utilized and the desired color temperature effect (e.g., match a desired color temperature, introduce a color temperature gradient, etc.).

As shown in FIG. 8, a CCTLL row 804, a CCTLL row 806, and a CCTLL row 808 may be located on the ceiling of the room 800. Although the CCTLLs are shown to be on the ceiling in FIG. 8, CCTLL rows and/or individual CCTLLs may be included in various configurations throughout room 800. CCTLL row 804 may be located closest to the window 802, followed by the CCTLL row 806, and the CCTLL row 808 may be the furthest CCTLL row away from the window 802. A motorized window treatment (e.g., a motorized roller shade 812) may be mounted adjacent the window 802 to control the amount of daylight entering the room 800, or the effect that daylight has on the color temperature in the room.

Depending on the desired lighting effect within room 800, a system controller (e.g., not shown in FIG. 8) may be configured to control the color temperature emitted by the light sources of one or more of the CCTLL rows 804, 806, 808. The system controller may automatically (e.g., inferred by the device itself based on sensor readings and/or pre-programmed settings) change the color temperature of one or more of the CCTLL rows 804, 806, 808. The system controller may also be configured to control automated blinds or shades that are configured to partially and/or completely block light from entering the room 800 via the window 802.

Figure 9:
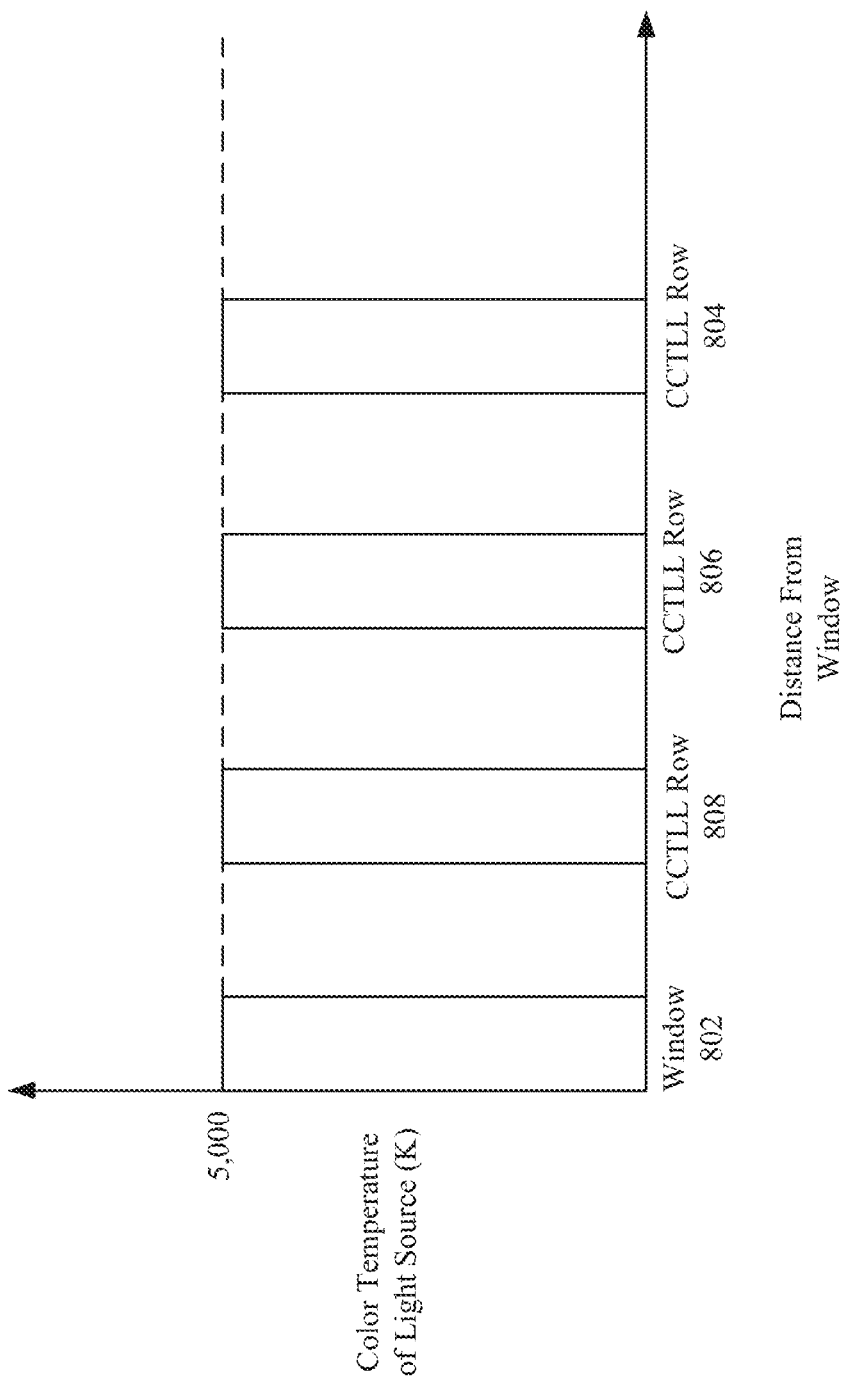
FIG. 9 is a graph of example color temperature values for a plurality of controllable-color-temperature lighting loads being matched to the color temperature of an ambient light source.

In an example, the system controller may receive an indication of the color temperature of the ambient light received through the window 802. The system controller may then send an indication to each of the CCTLL rows 804, 806, 808 to match the color temperature of the ambient light entering through the window 802. FIG. 9 is a graph illustrating an example where the color temperature of each of the CCTLL rows is matched to the ambient color temperature entering the room via the window 802. For example, a color temperature sensor may measure the color temperature of the window light to be approximately 5,000 K (e.g., noon daylight). The sensor reading may be sent to a system controller, which may instruct each of the CCTLL rows 804, 806, 808 to emit light at 5,000 K. Each of the CCTLL rows 804, 806, 808 may then control the intensity of one or more light sources to achieve a color temperature output of approximately 5,000 K. By matching the color temperature of each light source in the room to the ambient light from the window 802, a more desirable aesthetic effect may be achieved and the contents of the room may be less visible from the outside.

In an example, rather than setting the color temperature of each of the CCTLL rows to the ambient daylight color temperature, a gradient may be applied to the color temperature emitted by the CCTLL rows. For example, the CCTLL row closest to the window 802 (e.g., the CCTLL row 804) may be set to the color temperature of the ambient light entering the room 800 via the window 802. The next closest CCTLL row to the window 802 (e.g., the CCTLL row 806) may be set to a color temperature level above or below that of the ambient light entering via the window 802. For example, for some scenarios it may provide a desirable aesthetic effect to impart a color temperature gradient wherein the color temperature becomes gradually warmer (e.g., redder) as you move further from the window 802. Therefore, the CCTLL row 806 may be set to a lower color temperature than the CCTLL row 808. Similarly, the CCTLL row 804 may be set to a lower color temperature than the CCTLL row 806.

Figure 10:
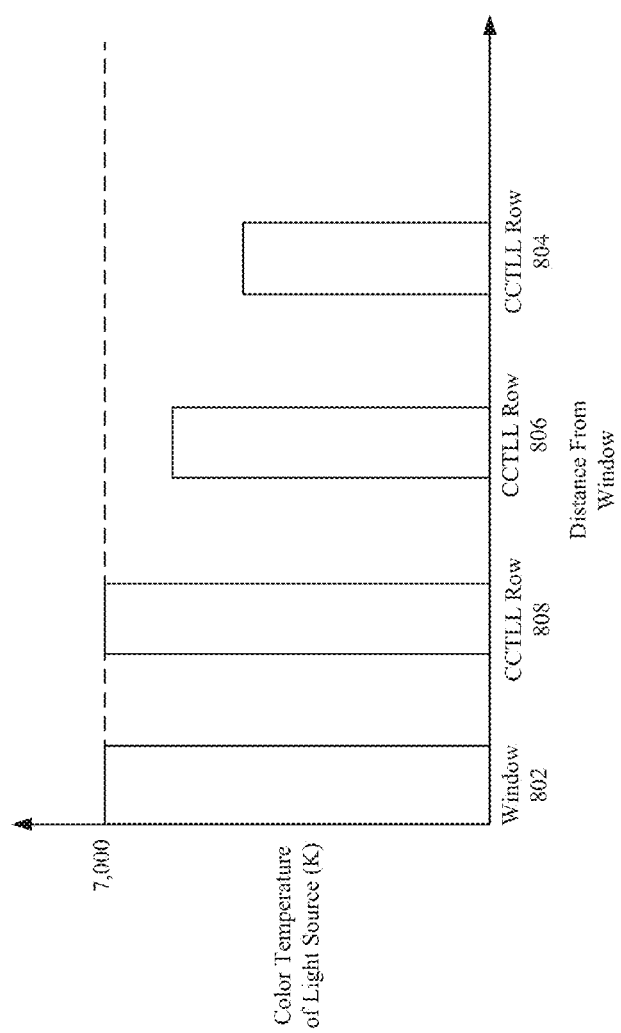
FIG. 10 is a graph of example color temperature values for a plurality of controllable-color-temperature lighting loads being utilized to form a color temperature gradient as the distance from an ambient light source increases.

FIG. 10 illustrates an example where a gradient may be applied to the CCTLL rows in order to gradually warm the light as you move further from the ambient light source (e.g., a window). As shown in FIG. 10, the ambient light entering through the window 802 may be approximately 7,000 K (e.g., an overcast day). The color temperature of the CCTLL row 808 may be set to match that of the ambient light entering via the window 802 (e.g., 7,000 K). The next CCTLL row (e.g., the CCTLL row 806) may be set to a warmer color temperature than that of the CCTLL row 808. For example, the CCTLL row 806 may be set to a color temperature of approximately 5,000 K, although other values may be utilized. Similarly, the CCTLL row 804 may be set to a warmer color temperature than that of the CCTLL row 806. For example, the CCTLL row 804 may be set to a color temperature of approximately 3,000 K, although other values may be utilized.

Figure 11:
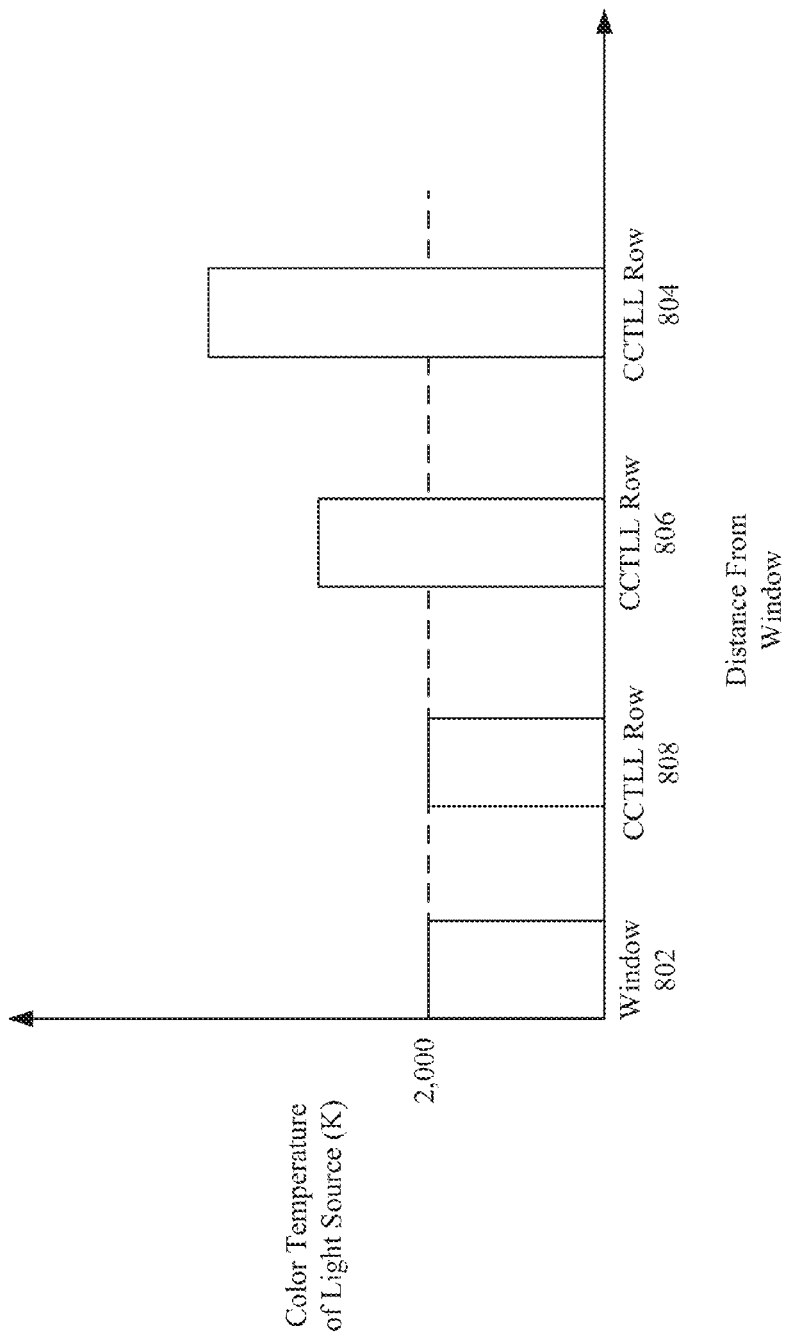
FIG. 11 is another graph of example color temperature values for a plurality of controllable-color-temperature lighting loads being utilized to form a color temperature gradient as the distance from an ambient light source increases.

In another example, rather than making the color temperature warmer as the CCTLL rows move further from the window, the CCTLL rows by made configured to become increasing cool (e.g., bluer) in value, for example to achieve a desired aesthetic effect. FIG. 11 illustrates an example where a gradient may be applied to the CCTLL rows in order to gradually cool the light as you move further from the ambient light source (e.g., a window). As shown in FIG. 11, the ambient light entering through the window 802 may be approximately 2,000 K (e.g., early sunrise). The color temperature of the CCTLL row 808 may be set to match that of the ambient light entering via the window 802 (e.g., 2,000 K). The next CCTLL row (e.g., the CCTLL row 806) may be set to a cooler color temperature than that of the CCTLL row 808. For example, the CCTLL row 806 may be set to a color temperature of approximately 3,000 K, although other values may be utilized. Similarly, the CCTLL row 804 may be set to a cooler temperature than that of the CCTLL row 806. For example, the CCTLL row 804 may be set to a color temperature of approximately 4,000 K, although other values may be utilized.

In an example, rather than setting the color temperature of each of the CCTLL rows to the ambient daylight color temperature, it may be desirable for the overall (e.g., composite) light within a room to be a relatively constant color temperature irrespective from its distance from an ambient light source. For example, suppose it is an overcast day, and that the ambient light entering the room 800 via the window 802 is approximately 7,000 K. However, it may be desirable that the light within the room 800 have a color temperature of approximately 5,000 K. Since the intensity of light from the window 802 is lessened as you move further from the window 802 and closer to the door 810, a gradient may be applied to the color temperature emitted by the CCTLL rows in order to achieve a relatively constant color temperature of approximately 5,000 K throughout the room. Thus, the CCTLL row closest to the window 802 (e.g., the CCTLL row 808) may be set to a relatively low color temperature in order to counter the effects of the relatively high color temperature ambient light entering via the window 802. Since the ambient light from the window 802 may be less intense at the CCTLL row 806 than at the CCTLL row 808, the CCTLL row 806 may be set to a slightly higher color temperature than the CCTLL row 808, since a less warm color temperature may be used to counteract the effects of ambient light from the window 802 at the location of the CCTLL row 806. Similarly, an even cooler color temperature may be used at the CCTLL row 804 since the ambient light from the window 802 may be even less intense at the location of the CCTLL row 804 than it is at the CCTLL row 806.

Figure 12:
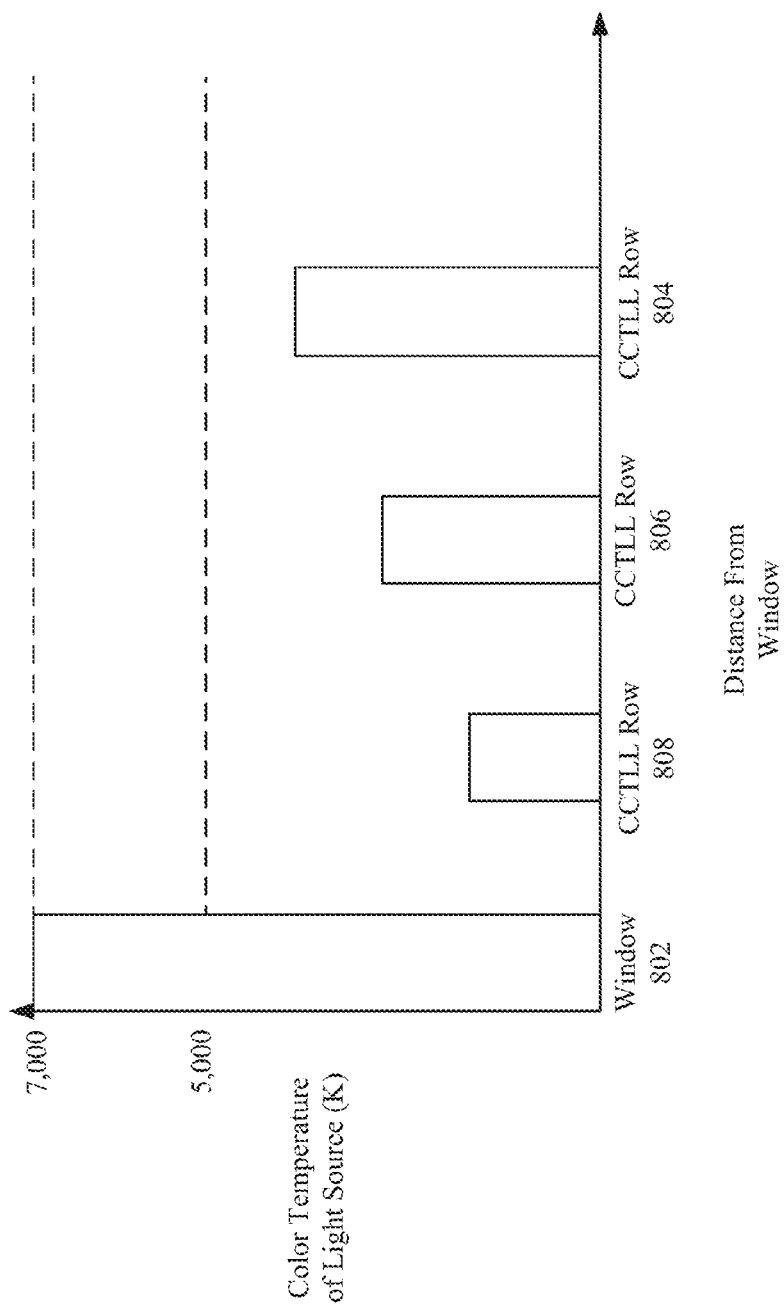
FIG. 12 is another graph of example color temperature values for a plurality of controllable-color-temperature lighting loads being utilized to form a color temperature gradient as the distance from an ambient light source increases.

FIG. 12 illustrates an example where a gradient may be applied to the CCTLL rows in order to achieve a relatively constant color temperature across a space that is different than the color temperature of an ambient light source in the space (e.g., ambient light entering via a window). As an example, the room may be a restaurant, and it may be more desirable to have the room lit with a relatively warmer (e.g., redder) light in order to achieve a desired lighting effect. In this example, suppose that the ambient daylight entering the room 800 via the window 802 has a color temperature of approximately 7,000 K (e.g., an overcast day) and the desired color temperature within the room 800 is approximately 5,000 K. The color temperature of the CCTLL row 808 may be set to the lowest (e.g., warmest) value of the CCTLL rows since the effects of the ambient light from the window 802 (e.g., at 7,000 K) may be strongest at the closest CCTLL row.

For example, the CCTLL row 808 may be set to a value in the range of 2,000 K. The next CCTLL row (e.g., the CCTLL row 806) may be set to a cooler color temperature than that of the CCTLL row 808, but the color temperature of the CCTLL row 806 may still be set to a value lower than the desired 5,000 K since the ambient light from the window 802 may still affect the overall light color temperature at the location of the CCTLL row 806. For example, the CCTLL row 806 may be set to a color temperature value in the range of 3,000 K. The final CCTLL row (e.g., the CCTLL row 804) may be set to a cooler color temperature than that of the CCTLL row 806, but the color temperature of the CCTLL row 804 may still be set to a value lower than the desired 5,000 K since the ambient light from the window 802 may still affect the overall light color temperature at the location of the CCTLL row 804. For example, the CCTLL Row 804 may be set to a color temperature value in the range of 4,000 K. It may be noted that the values selected for this example are exemplary in nature, and the actual values utilized may be selected based on factors such as the geometry of the room, the amount of ambient light entering the room via the window, the color temperature of other CCTLLs and/or other light sources within the room, the rate at which the ambient light grows less intense as you move further from the window, etc.

Figure 13:
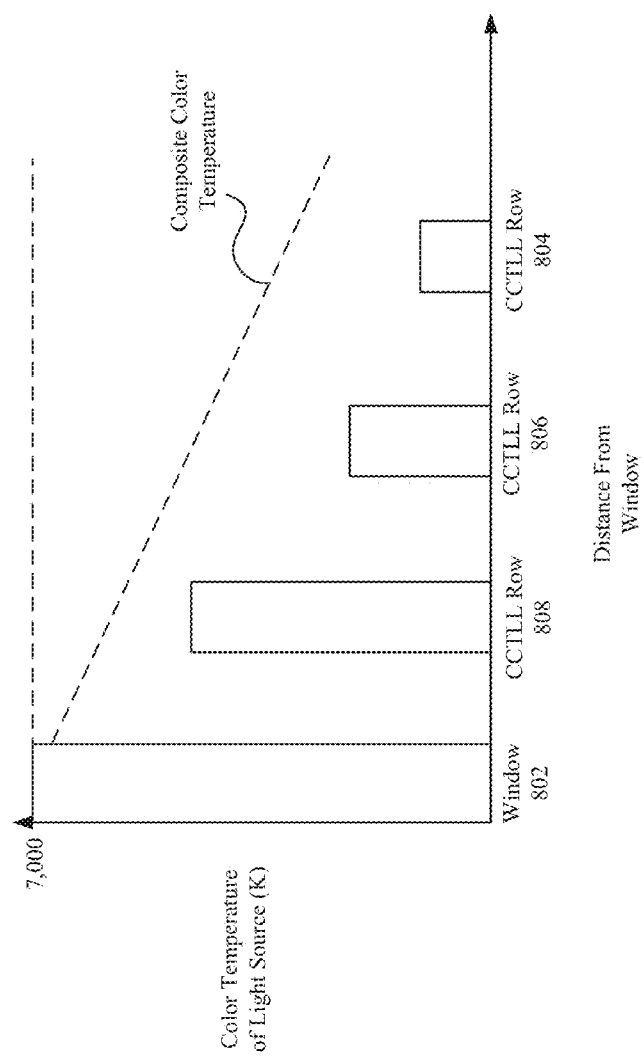
FIG. 13 is another graph of example color temperature values for a plurality of controllable-color-temperature lighting loads being utilized to form a color temperature gradient as the distance from an ambient light source increases.

In an example, CCTLL rows in a given area may be set to achieve a gradient of color temperatures within a room. For example, rather than attempting to have the overall color temperature in the room be a given color temperature, the color temperature of the CCTLL rows may be set to grow increasingly warm or increasing cool as you move closer to or away from a given side of the room. FIG. 13 illustrates an example where the color temperature of the CCTLLs may be set to be gradually warmer as you move further from a window. As shown in FIG. 13, the ambient light entering via the window 802 may have a color temperature of approximately 7,000 K. Each of the CCTLL rows may have their respective color temperatures set to be increasing warmer than the ambient light entering through the window. For example, the CCTLL row 808 may have a color temperature that is lower than the light entering from the window 802. The CCTLL row 806 may be set to have a lower color temperature than that of the CCTLL row 808. The CCTLL row 804 may be set to have a lower color temperature than that of the CCTLL row 806. In this manner, a gradient may be achieved such the overall color temperature of light reflecting off objects near the window may be cooler than the color temperature of the light reflecting off of objects near the door 810.

In an example, in addition to controlling the CCTLLs within a given vicinity, a system controller may also be configured to control one or more automated window shades in the vicinity. For example, some humans may have a physiological response to warmer (e.g., redder) light that makes them feel as if an ambient temperature in the room (or space) is warmer than it actually is. Such an effect may be utilized in conjunction with CCTLLs to potentially save energy used for heating a building. For example, suppose it is a cold, overcast day during the winter. The color temperature of the ambient light entering a room on such a day may be in the range of 7,000 K and the temperature may be in the range of 30° F. Typically, the heating and/or cooling system for the room may be set to near 70° F. on such a day. However, a system controller may be in communication with a color temperature sensor and/or a room temperature sensor (e.g., a thermometer or thermostat). In order to make it appear that the room is warmer than it actually is, the system controller may send a command to automated window shades that indicates that the shades should partially or fully obscure the relatively cool (e.g., 7,000 K) light entering via a window. Additionally, the system controller may instruct one or more CCTLLs within the room to operate using a relatively warm color temperature, for example in the range of 1,000-3,000 K. By changing the overall color temperature of the room to be warmer, the thermostat may be set to a lower temperature than it typically would given the weather conditions, for example in the range of 65° F. The light with a relatively red color temperature may have the effect of making a person in the room feel as if the 65° F. room with redder light is just as warm as the 70° F. room with bluer light. In this way, large amounts of energy savings may be achieved due to the energy intensive nature associated with heating the room the extra 5° F.

In an example, a CCTLL may be utilized to "match" the color temperature of other light sources in an area. For example, a room may include one or more continuous-spectrum light sources that operate at a given brightness level. If one of the continuous-spectrum light sources fails, it may be desirable to replace the failed continuous-spectrum light source with discrete-spectrum light sources, for example to achieve energy savings. However, it may be difficult to match the color temperature of the continuous-spectrum light sources with that of a discrete-spectrum light source, and without matching the color temperatures of the light sources, the replacement discrete-spectrum light source may look unnatural or out-of-place. Thus, a CCTLL may be utilized instead of the traditional discrete-spectrum light source. For example, a CCTLL with a color temperature sensor may be installed with the continuous-spectrum light sources. The color temperature sensor may indicate the approximate color temperature of the continuous-spectrum light sources to the CCTLL. The CCTLL may then adjust its color temperature to match that of the continuous-spectrum light sources in order to provide an aesthetically pleasing appearance.

In another example, a CCTLL may be utilized to match the color temperature of other discrete-spectrum light sources in an area. For example, over time discrete-spectrum light sources may degrade or otherwise change their color temperature profile. Thus, even though a given discrete-spectrum light source was designed to have a given color temperature, over time the discrete-spectrum light source may begin emitting light at a different color temperature. Therefore, it may be difficult to find another discrete-spectrum light source that matches the color temperature of the degraded discrete-spectrum light source. In an example, a CCTLL may be used to match the color temperature of the degraded discrete-spectrum light source. A CCTLL with a color temperature sensor may be installed with the degraded discrete-spectrum light source(s). The color temperature sensor may indicate the approximate color temperature of the degraded discrete-spectrum light source(s) to the CCTLL. The CCTLL may then adjust its color temperature to match that of the degraded discrete-spectrum light source(s) in order to provide an aesthetically pleasing appearance.

A system controller and/or one or more CCTLLs may utilize feedback from one or more sensors. For example, the sensors may provide information regarding the current state of the CCTLLs. As noted above, discrete-spectrum light sources may have their color temperature change or degrade over time. Since a CCTLL may be comprised of two or more discrete-spectrum light sources, CCTLL operation may be effected by changes in the characteristics of one or more of its underlying discrete-spectrum light sources. For example, the control circuit and/or the system controller for a CCTLL may expect that each of the discrete-spectrum light sources included in a CCTLL emits light at a given color temperature. The system controller and/or control circuit may rely on this expectation to determine the appropriate dimming values for the discrete-spectrum light sources included in the CCTLL. Thus, if one or more of the discrete-spectrum light sources included in the CCTLL degrade or otherwise change their color temperature response, the CCTLL may emit light with a composite color temperature different than what is configured/expected by the system controller and/or control circuit.

Therefore, a sensor such as a color temperature sensor may be utilized to provide feedback to the system controller and/or control circuit regarding the current state of one or more CCTLLs. For example, a color temperature sensor may be designed to measure the color temperature emitted by one or more discrete-spectrum light sources included in a CCTLL, the composite color temperature of light emitted by a given CCTLL, and/or the composite color temperature of light emitted by a plurality of CCTLLs. The system controller and/or control circuit may utilize the feedback information to correct for degradation of one or more discrete-spectrum light sources and/or to otherwise adjust the operation of the CCTLLs.

As an example, a color temperature sensor may be configured to measure the color temperature of composite light emitted by the two or more discrete-spectrum light sources included in a CCTLL. The color temperature sensor may provide the measurements as feedback to the control circuit of the CCTLL and/or a system controller. The control circuit may adjust the intensity level of one or more of the discrete-spectrum light sources based on the feedback. For example, if the feedback indicates that color temperature of the emitted light is lower (e.g., warmers, redder) than what was expected, the control circuit may increase the intensity level of a warmer discrete-spectrum light source of the CCTLL and/or may decrease the intensity level of a cooler discrete-spectrum light source of the CCTLL. In an example, rather than or in addition to monitoring the color temperature of the composite light emitted from the CCTLL, a color temperature sensor may measure the color temperature emitted by one or more of the discrete-spectrum light sources included in a CCTLL. The information regarding the color temperature emitted by one or more of the discrete-spectrum light sources included in a CCTLL may be fed back to a system controller and/or to the control circuit of the CCTLL. The system controller and/or the control circuit of the CCTLL may utilize the feedback information when determining the amount by which each of the two or more discrete-spectrum light sources should be dimmed in order to achieve a desired color temperature output from the CCTLL.

In an example, the color temperature of one or more CCTLLs in a space may be set based on a current use of the space or an activity occurring in the space. For example, if a room is being used for a business meeting, a system controller may determine to set the CCTLLs in the room to a relatively cooler color temperature to encourage/facilitate productivity. The system controller may receive an indication of the current use of the room via a user interface or the like (e.g., a scene or preset selection), and/or may infer the current use of the room based on sensor readings or other inputs. The user interface may be included at the system controller. In an example, if the room is included in an office building, the system controller (e.g., and/or a control circuit of the CCTLL) may utilize a time clock, an occupancy sensor, and/or other sensors to determine the color temperature to be used for one or more CCTLLs in the room. For instance, during business hours, the CCTLLs may be set to a cooler color temperature in order to encourage productivity. However, after business hours, the CCTLLs may be set to warmer temperatures (e.g., if an occupancy sensor indicates the room is occupied after normal business hours) so that the room may be more amenable to a more social, relaxed setting.

Gradients of color temperature within a room may be set based on a determined or inferred use of the room. For example, an engineer's office may include a desk with a computer workstation on one side of the room and a work bench on the other side of the room. It may be desirable to set the CCTLLs near the desk to a first color temperature and the CCTLLs near the work bench to a second color temperature. For example, the CCTLLs near the desk may be set to a cooler color temperature and the CCTLLs near the work bench may be set to a warmer color temperature. In an example, the CCTLLs within the engineer's office may be set to the same color temperature and the color temperature that is set may depend on the position of a person within the office. For example, if an occupancy sensor detects a person near the desk, the CCTLLs in the room may be set to a cooler color temperature. If the occupancy sensor detects that the person moves to or is otherwise near the workbench, the color temperature of the CCTLLs may be changed to a warmer color temperature.

In an example, a system controller and/or a control circuit of a CCTLL may infer a use of the room, for example based on sensor readings, and may set an appropriate color temperature of one or more CCTLLs based on the inferred use. For example, if an occupancy sensor indicates that a room is occupied, but a motion sensor indicates that the person(s) are not moving (e.g., the occupants are relatively stationary), the system controller and/or a control circuit of a CCTLL may infer that the occupant is reading or otherwise working. In this scenario, the system controller and/or the control circuit of the CCTLL may set one or more CCTLLs to a cooler color temperature to facilitate productivity or encourage productive reading. Rather than or in addition to using the occupancy sensor/motion detector, a camera may be used to determine the location of persons within a room and/or to infer the current use of a room. For example, picture or video analysis techniques may be utilized to determine the number of people in a room, the relative amount of movement in the room, and/or other information about the use of the room such that the system controller and/or the control circuit of the CCTLL may determine an appropriate color temperature setting for one or more CCTLLs in the room. For example, if it is determined that a room has a certain number of occupants (e.g., more than three, although other values may be utilized), the system controller and/or the control circuit of a CCTLL may determine that the room is being used for social purposes and may set one or more CCTLLs to a relatively warm color temperature setting.

In an example, the system controller and/or the control circuit of a CCTLL may determine to gradually change the color temperature of one or more CCTLLs over time. For example, a room may originally be set to use a relatively warm color temperature. However, since discrete-spectrum light sources may operate more efficiently (e.g., produce more lumens per watt) at a cooler color temperature, the system controller and/or the control circuit of a CCTLL may determine to gradually cool one or more CCTLLs in the room in order to save energy. By transitioning more gradually, people within the room may be unaffected since the change is not abrupt (e.g., the persons may not notice the gradual change in color temperature). In an example, the CCTLLs may default to turning on to a relatively warm color temperature and may autonomously, gradually transition (e.g., based on control information received from a system controller and/or control circuit) to a cooler color temperature the longer they are left on.

In an example, lighting for an emergency exit (and/or other areas such as stairwells, hallways, or rooms) may be set to a relatively cool color temperature setting when unoccupied (e.g., such that the CCTLLs operate more efficiently), but may be transitioned to a warmer color temperature when occupied. In an example, the CCTLLs used for emergency lighting may be powered by electricity from the electric grid or from an emergency back-up source (such as an emergency generator or battery backup for when grid electricity is unavailable). During periods where the CCTLLs are powered by regular electrical grid sources the CCTLLs may be set to first color temperature (e.g., a warmer color temperature) and during periods where the CCTLLs are powered by the emergency backup source, the CCTLLs may be set to a second color temperature (e.g., a cooler, more power efficient color temperature).

In an example, an electric utility or other entity may indicate periods of higher energy use to a system controller and/or control circuit of a CCTLL. For example, the indication may include a demand response command that indicates that an electric grid is under a relatively high load. For example, during the daytime during the summer, the electric grid may be running near capacity. The electric utility may indicate that cost savings may be achieved if a given user reduces their energy use during the periods. In response to such demand response commands, the system controller and/or the control circuit of the CCTLL may control one or more CCTLLs to transition to a cooler color temperature in order to save energy. In an example, the determination to transition to a cooler (or warmer) color temperature may be based on the current price of electricity on the grid. Other examples indicating periods during which a CCTLL may operate using a bluer color temperature in order to operate in a power savings mode are described in commonly-assigned U.S. Pat. No. 8,417,388, issued Apr. 9, 2013, entitled LOAD CONTROL SYSTEM HAVING AN ENERGY SAVINGS MODE, the entire disclosure of which is incorporated by reference. Similarly, certain buildings may operate in an "afterhours" mode, where equipment is powered at more power efficient settings when in afterhours mode. In an example, when in afterhours mode, CCTLLs may operate using bluer light than is used during normal (e.g., business) hours.

In an example, a system controller and/or a control circuit of a CCTLL may determine an appropriate color temperature for one or more CCTLLs based on the current time of day and/or the current time of the year. For example, during periods near the beginning and end of the daytime (e.g., sunrise and sunset, respectively) the color temperature of one or more CCTLLs may be set to a relatively warm color temperature to mimic the color temperature from the sun, and during the middle of the day the color temperature may be set to a cooler color temperature. In an example, during the winter months, the color temperature may be set to a warmer color temperature in order to encourage people to "feel" warmer even though it may be cold outside. Conversely, during the summer months, the color temperature may be set to a cooler temperature since it may be hotter outside.

In an example, the color temperature may be set based on the orientation of a building. For example, rooms on a building's north side (e.g., which in the Northern Hemisphere may receive less direct sunlight) may be set to a first color temperature and rooms on the building's south side may be set to a second color temperature. A shadow sensor may also be used to determine the appropriate color temperature. In an example, the color temperature may be set based on the location (e.g., latitude and longitude) of the CCTLL. For example, CCTLLs in more tropical regions may be set to a first color temperature and CCTLLs in more temperate regions may be set to a second color temperature.

In an example, the appropriate color temperature may be set based on media being utilized in a given area. For example, if a projector is in use, the system controller and/or control circuit may infer the room is being utilized for a presentation. The color temperature of CCTLLs in the room may then be set to a relatively warm color temperature to contrast with the projector screen. In an example, the color temperature may be set based on one or more applications being executed on a computing device. For example, if presentation application is being executed on the computing device and/or the presentation application is being displayed on the display of the computing device, the system controller and/or control circuit may determine that the color temperature in the room should be set to a warmer color temperature. If a word processing application is running or active, the system controller and/or control circuit may determine that the color temperature in the room should be set to a cooler color temperature.

In an example, the system controller and/or control circuit may determine the appropriate color temperature based on the type content of media being utilized in the vicinity. For example, a first color temperature be utilized if a first media device is in operation (e.g., a television) and a second color temperature may be utilized if a second media device is in operation (e.g., a video game console). In an example, the color temperature may be set based on the identity of the media content being utilized. For example, for a horror movie the system controller and/or control circuit may determine that the color temperature in the room should be set to a first color temperature (e.g., a cooler color temperature), but for a romantic movie the system controller and/or control circuit may determine that the color temperature in the room should be set to a second color temperature (e.g., a warmer color temperature).

In an example, the system controller and/or control circuit may determine that the color temperature in the room should be set to a given color temperature based on the appliances in operation in the vicinity. For example, if a television is turned on, the system controller and/or control circuit may determine that the color temperature in the room should be set to a warmer color temperature. In an example, if the system controller and/or control circuit determines that certain devices are not in operation, the system controller and/or control circuit may infer the room is not occupied an may be the color temperature to a cooler color temperature to conserve energy.

In an example, the system controller and/or control circuit may determine that the color temperature in the room should be set to a given color temperature based on weather conditions. For example, during periods of snow, the CCTLLs may be set to a first color temperature (e.g., a warmer color temperature so that people may feel warmer) and during hot, sunny days the CCTLLs may be set to a second color temperature (e.g., a cooler color temperature so that people feel cooler). As an example, the system controller and/or control circuit may have internet access to obtain the weather information or other information utilized to make decisions regarding the appropriate color temperature of a CCTLL.

In an example, multiple CCTLLs may be used to guide people within an area. For example, during emergency scenarios the CCTLLs within a room or hallway may indicate a path to an emergency exit. For example, a line or path of CCTLLs operating at a relatively cool color temperature may be used to indicate the path to the emergency exit. Other CCTLLs not on the path to the emergency exit may be set to a warmer color temperature (e.g., as well as dimmed). In an example, a gradient of color temperatures may be used to guide people to an emergency exit. For example, the CCTLLs closest to the emergency exit may be set to a very cool color temperature and CCTLLs furthest from the emergency exit may be set to a very warm color temperature. The remaining CCTLLs may be have their color temperature set based on a gradient, where the color temperatures become increasingly cool as distance from the emergency exit decreases.

In an example, the CCTLLs may be used as a commissioning tool for identifying the addresses of the CCTLLs. Examples of commissioning tools and/or lighting load commissioning methods are described in commonly-assigned U.S. patent application Ser. No. 13/796,877, filed Mar. 12, 2013, entitled IDENTIFICATION OF LOAD CONTROL DEVICES, and/or U.S. patent application Ser. No. 13/830, 237, filed Mar. 14, 2013, entitled, COMISSIONING LOAD CONTROL SYSTEMS, the entire disclosures of which are incorporated by reference herein. In an example, when installing and configuring lighting systems, an installer/administrator may attempt to identify which lighting loads and/or CCTLLs are associated with a given zone or identifier in the lighting control system. In an example, in order to differentiate CCTLLs in different zones and/or different addresses, during a commissioning mode the CCTLLs may be set to a determined color temperature depending on which zone or address the CCTLL is associated with. For example, CCTLLs associated with a first zone or address may be set to a first color temperature, CCTLLs associated with a second zone or address may be set to a second color temperature, etc. In an example, a camera (such as on a camera included in a smart phone) may be used to take a picture or video of the CCTLLs during commissioning. An analysis of the picture/video may then be performed to determine which CCTLLs are associated with which address/zone.

Figure 14:
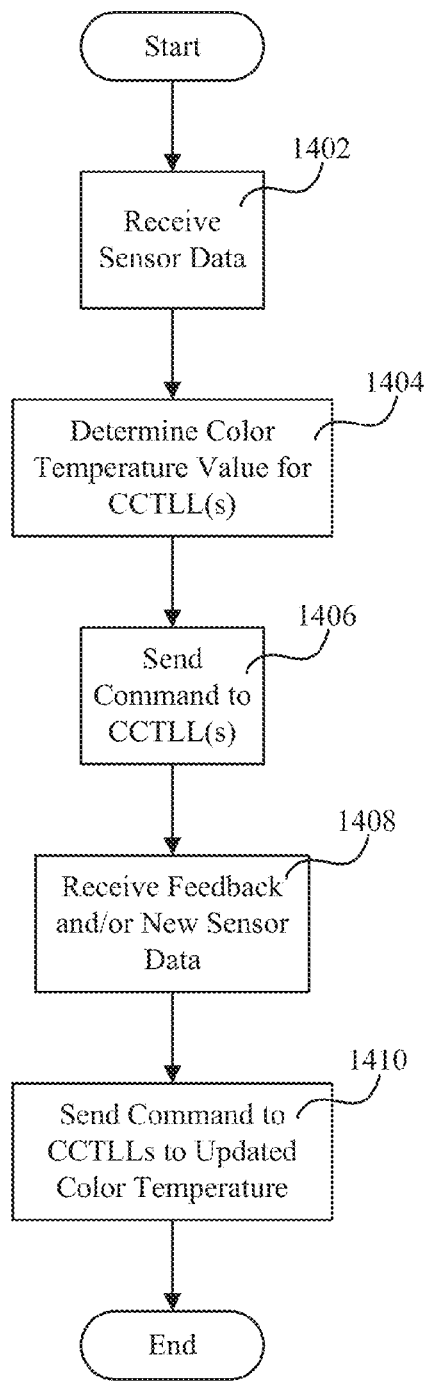
FIG. 14 is a flowchart depicting an example method for controlling one or more controllable-color-temperature lighting loads.

FIG. 14 is a flowchart depicting an example method for controlling the color temperature of the light emitted by one or more CCTLLs. For example, the method depicted by FIG. 14 may be implemented by a system controller. Similar methods may be implemented by a control circuit of a CCTLL.

For example, at 1402, sensor data from one or more sensors may be received. The sensor data may include one or more of occupancy data, ambient light data (e.g., color temperature data, light intensity data, light frequency data, etc.), data regarding appliances in use, data related to the power source for the CCTLL, position data, temperature data, time data, date data, data from the Internet, weather data, data regarding media being utilized, etc. Information regarding user preferences or settings may also be received or determined.

At 1404, appropriate color temperature values for one or more CCTLLs may be determined. The determination of the appropriate color temperature value may be based on one or more of the sensor data, information related to the layout of the room/space including the CCTLLs, information regarding the relative location of the CCTLL(s) with respect to each other, information regarding the relative location of the CCTLL(s) with respect to ambient light sources, information regarding the layout of the space/room that includes the CCTLLs, user preferences or settings, an inferred use of the space/room including the CCTLLs, etc.

At 1406, command(s) indicating the appropriate color temperature setting/value may be sent to the one or more CCTLLs. The one or more CCTLLs may be set to the same or different color temperature values. The CCTLLs may transition to the appropriate color temperature(s) based on the command. The command may be a digital or analog signal that may be sent wirelessly or via wired communication lines. For example, if a command indicates that a given CCTLL is to operate at a relatively higher (e.g., bluer) overall color temperature, the CCTLL may be configured to increase the intensity of a relatively high color temperature discrete-spectrum light source and/or to lower the intensity of a relatively low color temperature discrete-spectrum light source. Conversely, if a command indicates that a given CCTLL is to operate at a relatively lower (e.g., redder) overall color temperature, the CCTLL may be configured to increase the intensity of a relatively low color temperature discrete-spectrum light source and/or to lower the intensity of a relatively high color temperature discrete-spectrum light source.

At 1408, new sensor data and/or feedback information from one or more of the CCTLLs may be received. For example, an occupancy sensor may indicate that all people have left the room. The feedback information may include, for example, information from sensors included at the one or more CCTLLs, information related to the state of one or more of the CCTLLs, and/or other information that may be useful in identifying an appropriate color temperature value for the one or more CCTLLs. A new color temperature value may be determined for one or more CCTLLs based on the updated data. At 1410, a command may be sent to one or more of the CCTLLs that instructs the one or more CCTLLs to operate at an updated color temperature value.

Figure 15:
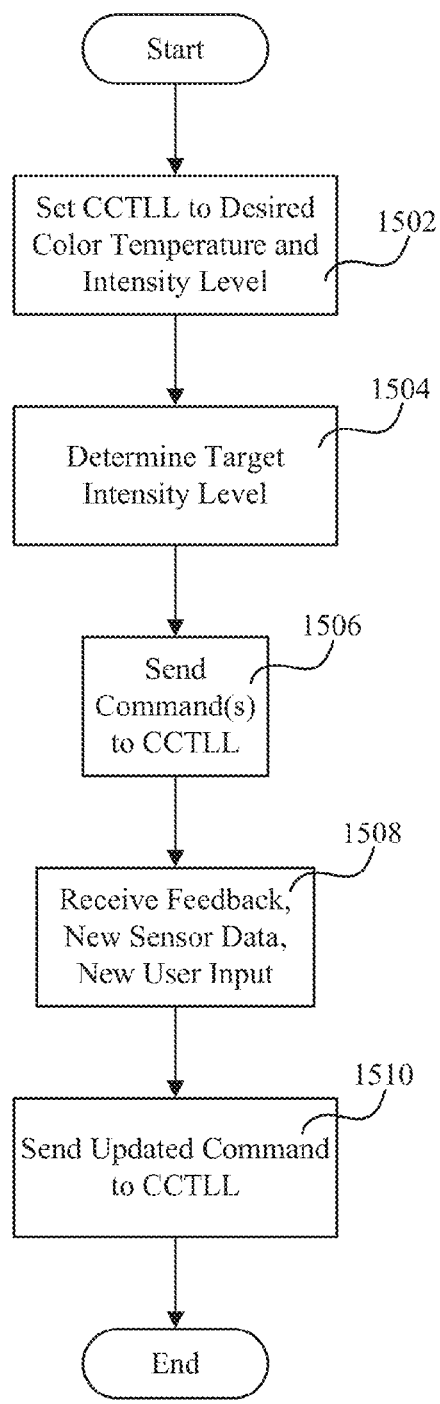
FIG. 15 is a flowchart depicting an example method for adjusting the overall intensity of a controllable-color-temperature lighting load.

FIG. 15 is a flowchart depicting an example method for adjusting the overall intensity of the light emitted by a CCTLL without significantly affecting the color temperature of the composite light. The method depicted by FIG. 15 may be implemented by a system controller. Similar methods may be implemented by a control circuit of a CCTLL, for example if the CCTLL is operating autonomously.

For example, at 1502, the CCTLL may be set to a desired color temperature value and a desired intensity level. For example, the CCTLL may be originally set at a maximum achievable intensity level for a give color temperature value upon initiating operation. For example, this may be the case when the CCTLL is initially turned or powered on. However, various combinations of intensity level and color temperature may be set at 1502. For example, the intensity level and/or color temperature may be set based on sensor data from one or more sensors. As noted above, the sensor data may include one or more of occupancy data, ambient light data (e.g., color temperature data, light intensity data, light frequency data, etc.), data regarding appliances in use, data related to the power source for the CCTLL, position data, temperature data, time data, date data, data from the Internet, weather data, data regarding media being utilized, etc. Information regarding user preferences or settings may also be received or determined in order to determine the appropriate overall intensity level and/or color temperature value to use for the CCTLL based on the received sensor data. When referring to FIG. 15, the intensity level of the CCTLLs may refer to the intensity of the composite or combined light emitted by a plurality of light sources comprised in the CCTLL.

At 1504, a target intensity level (or an adjustment amount by which the overall intensity level may be adjusted) may be determined. In the example of FIG. 15, the overall intensity level may be adjusted without substantially affecting the color temperature of the light emitted from the CCTLL (e.g., the overall intensity level is adjusted without substantially changing the color temperature of the emitted light). For example, the system controller may determine to dim the CCTLL to the target intensity level, for instance upon receiving a user input requesting that the light be dimmed to the target intensity level. Based on the target intensity level, at 1506 the system controller may send one or more commands to the CCTLLs to adjust the intensity of the CCTLLs to the target intensity level. For example, the system controller may send individual commands indicating the individual intensity levels of light sources in the CCTLLs (or the amounts by which the individual intensity levels of light sources in the CCTLLs should be adjusted). In an example, the system controller may send a command indicating the amount by which the total light intensity of the CCTLL should be adjusted, and the CCTLL may independently determine the change in individual light source intensities that would result in the commanded total intensity change while maintaining a relatively constant color temperature.

Irrespective of whether the system controller and/or the CCTLLs determines the individual intensity level changes of the light sources in the CCTLLs, the total intensity level of the CCTLL may be adjusted by maintaining a desired intensity ratio between the individual light source elements of the CCTLL while decreasing (e.g., to dim) or increasing (e.g., to brighten) each of the individual light source elements. For example, if a given CCTLL is comprised of three discrete-spectrum light sources, and a desired color temperature is achieved by operating a first discrete-spectrum light source at a first intensity level, a second discrete-spectrum light source at a second intensity level, and a third discrete-spectrum light source at a third intensity level, then in order to dim the overall combined intensity level of the CCTLL by about a third, the first intensity level may be lowered by a third, the second intensity level may be lowered by a third, and third intensity level may be lowered by a third. Conversely, to increase the overall combined intensity level of the CCTLL by about a third, the first intensity level may be increased by a third, the second intensity level may be increase by a third, and third intensity level may be increased by a third. Although three light sources per CCTLL are used for this example, more or fewer light sources may be used in a CCTLL and the overall intensity level may be increased or decreased by adjusting the component intensity levels while maintaining a specified ratio between the component light source intensity levels.

Although the example of dimming (or brightening) the CCTLL by a third is described as individually adjusting the intensity of the light sources by a third, in some scenarios the individual light source adjustments may be different than the overall intensity adjustment. For example, depending on the respective color temperature values of light emitted by the individual light sources of a given CCTLL, it may be that a given color temperature value and overall composite intensity level may be achieved using various combinations of intensities at the individual light sources. For example, a decrease in overall intensity of a CCTLL by a third may be achieved by dimming each of the individual light sources by a third or by powering off one of the light sources completely while varying the intensity levels of the two other light sources in order to obtain the desired composite color temperature and intensity level. Utilizing a greater number of light sources in a CCTLL may increase the number of potential combinations of individual intensity levels for light sources that result in the same composite color temperature and the same composite light intensity.

At 1508, new sensor data, user commands, and/or feedback information from one or more of the CCTLLs may be received. For example, an occupancy sensor may indicate that all people have left the room, and the device may be programmed to dim the CCTLLs while maintaining a constant color temperature of the composite light emissions. In an example, a user may select a new dimming value (i.e., the target intensity level) using an input device such as a dimmer. The feedback information may include, for example, information from sensors included at the one or more CCTLLs, information related to the state of one or more of the CCTLLs, and/or other information that may be useful in identifying an appropriate color temperature value for the one or more CCTLLs. Based on the updated data, the system controller may send an updated command to the CCTLL to adjust the overall intensity level while maintaining a constant color temperature.

At 1510, the system controller may send an updated command to the CCTLL, for example based on the updated inputs determined at 1508. For example, if the sensor data at 1508 indicated that the room is no longer occupied, the system controller may send a command to decrease the overall intensity level of emitted light by half. The CCTLL may then dim the individual light sources—for example while maintaining the same relative intensity ratio between the light sources—in order to achieve the desired intensity change (e.g., dimming the CCTLL by 50% while maintaining a constant color temperature).

What is claimed:

1. A method for automated control of color temperature, the method comprising:
   receiving information that comprises data related to a power source;
   determining a color temperature value for a controllable-color-temperature lighting load (CCTLL) of a plurality of CCTLLs based on the information that comprises the data related to the power source, wherein the data related to the power source indicates whether the CCTLL is powered by an emergency power source; and
   controlling the CCTLL in order to operate the CCTLL at the color temperature value, wherein the CCTLL is controlled to a higher color temperature value if the CCTLL is determined to be powered by the emergency power source and a lower color temperature value if the CCTLL is determined to be powered by a power source other than the emergency power source.

2. The method as in claim 1, wherein the information comprises sensor information from one or more sensors, wherein the sensor information received from the one or more sensors is associated with daylight measured by at least one sensor of the one or more sensors.

3. The method as in claim 2, wherein the CCTLL of the plurality of CCTLLs comprises a first discrete-spectrum light source and a second discrete-spectrum light source, wherein the first discrete-spectrum light source and the second discrete-spectrum light source emit light at different color temperature values, and wherein the CCTLL of the plurality of CCTLLs adjusts a composite color temperature of the emitted light by varying a first intensity level of the first discrete-spectrum light source and varying a second intensity level of the second discrete-spectrum light source.

4. The method as in claim 3, wherein the first discrete-spectrum light source emits the light with a substantially red color temperature, and the second discrete-spectrum light source emits the light with a substantially blue color temperature value.

5. The method as in claim 3, wherein the first discrete-spectrum light source comprises a first light emitting diode (LED) light source, wherein the first LED light source comprises an LED driver and an LED light engine, wherein the LED driver is configured to adjust an intensity level of the LED light source using phase control signals.

6. The method as in claim 3, wherein the second discrete-spectrum light source comprises a compact fluorescent lamp, and wherein the compact fluorescent lamp is controlled by an electronic ballast.

7. The method as in claim 3, wherein the composite color temperature of the emitted light is varied by adjusting the first intensity level and the second intensity level while maintaining a specified ratio between the first intensity level and the second intensity level.

8. The method as in claim 2, wherein the one or more sensors comprise one or more of an occupancy sensor, a daylight sensor, a color temperature sensor, a temperature sensor, a shadow sensor, or a camera.

9. The method as in claim 2, wherein the sensor information comprises information related to a use of a room including the plurality of CCTLLs, and wherein determining the color temperature value for the CCTLL comprises:
   determining an inferred use of the room including the plurality of CCTLLs based on the information related to the use of the room; and
   determining the color temperature value for the CCTLL based on the inferred use of the room.

10. The method as in claim 2, wherein the sensor information comprises occupancy information and the color temperature value for the CCTLL comprises a first color temperature value if the occupancy information indicates that a room including the plurality of CCTLLs is occupied or a second color temperature value if the occupancy information indicates that the room including the plurality of CCTLLs is unoccupied.

11. The method as in claim 10, wherein the first color temperature value is less than the second color temperature value.

12. The method as in claim 2, wherein the plurality of the CCTLLs are controlled to operate each CCTLL of the plurality of the CCTLLs at a respective color temperature, wherein controlling the plurality of CCTLLs comprises:
   sending a first signal to a first CCTLL, the first signal comprising an indication to operate at a first color temperature value;
   sending a second signal to a second CCTLL, the second signal comprising an indication to operate at a second color temperature value; and
   sending a third signal to a third CCTLL, the third signal comprising an indication to operate at a third color temperature value.

13. The method as in claim 12, wherein the first color temperature value, the second color temperature value, and the third color temperature value are approximately a same color temperature value.

14. The method as in claim 13, the method further comprising:
   determining, based on the sensor information, a color temperature value of the daylight measured by the at least one sensor, wherein the first color temperature value, the second color temperature value, and the third color temperature value are selected to be approximately a same color temperature value as the color temperature value of the daylight.

15. The method as in claim 12, the method further comprising:
   determining, based on the sensor information, a color temperature value of the daylight measured by the at least one sensor, wherein the first color temperature value is approximately a same color temperature value as the color temperature value of the daylight, the second color temperature value is lower than the first color temperature value, and the third color temperature value is lower than the second color temperature value.

16. The method as in claims 15, wherein the first CCTLL is closer to a source of the daylight than the second CCTLL, and the second CCTLL is closer to the source of the daylight than the third CCTLL.

17. The method as in claim 12, the method further comprising:
   determining, based on the sensor information, a color temperature value of the daylight measured by the at least one sensor, wherein the first color temperature value is approximately a same color temperature value as the color temperature value of the daylight, the second color temperature value is higher than the first color temperature value, and the third color temperature value is higher than the second color temperature value.

18. The method as in claim 12, wherein each of the first color temperature value, the second color temperature value, and the third color temperature value is selected based on a respective distance from a source of the daylight and a relative location of each of the first CCTLL, the second CCTLL, and the third CCTLL with respect to the source of the daylight.

19. The method as in claim 1, wherein the information comprises sensor information received from one or more sensor, wherein the sensor information received from the one or more sensors is associated with daylight measured by at least one sensor, and the method further comprises:
   determining, based on the sensor information, a color temperature of the daylight measured by the at least one sensor, wherein the color temperature value for the CCTLL of the plurality of CCTLLs is determined relative to the color temperature of the daylight.

20. The method as in claim 1, wherein the color temperature value for the CCTLL is determined based on a distance of the CCTLL from a source of daylight, and the method further comprises controlling the plurality of CCTLLs to produce a gradient of color temperatures across the plurality of CCTLLs from the source of the daylight.

21. The method as in claim 1, wherein the CCTLL of the plurality of CCTLLs is configured to vary a color temperature of an emitted light by adjusting an intensity level of at least one discrete-spectrum light source.

22. A system comprising:
   a plurality of controllable-color-temperature lighting loads (CCTLLs); and
   a system controller configured to autonomously control color temperature values of the plurality of CCTLLs based on information that comprises data related to a power source, wherein the system controller is configured to:
      receive the information that comprises the data related to the power source;
      determine a color temperature value for a CCTLL of the plurality of CCTLLs based on the information that comprises the data related to the power source, wherein the data related to the power source indicates whether the CCTLL is powered by an emergency power source; and
      control the CCTLL in order to operate the CCTLL at the color temperature value, wherein the CCTLL is controlled to a higher color temperature value if the CCTLL is determined to be powered by the emergency power source and a lower color temperature value if the CCTLL is determined to be powered by a power source other than the emergency power source.

23. The system as in claim 22, wherein each CCTLL of the plurality of CCTLLs comprises a communication circuit configured to receive an indication of a respective color temperature value from the system controller.

24. The system as in claim 23, wherein the communication circuit is further configured to provide feedback information to the system controller.

25. The system as in claim 23, wherein the indication comprises an analog signal.

26. The system as in claim 23, wherein the indication comprises a digital address and a digital indication of the respective color temperature value.

27. The system as in claim 23, wherein the communication circuit is further configured to communicate with one or more sensors.

28. The system as in claim 22, wherein each of the plurality of CCTLLs comprises at least one control circuit, at least one communication circuit, at least two light sources, and at least two respective load regulation circuits for the at least two light sources, and wherein at least one of the at least two light sources comprises a discrete-spectrum light source.

29. The system as in claim 28, wherein the discrete-spectrum light source comprises one of a light emitting diode (LED) light source or a fluorescent light source.

30. The system as in claim 22, wherein the information comprises sensor information from one or more sensors, wherein the sensor information from the one or more sensors is associated with daylight measured by at least one sensor of the one or more sensors.

31. The system as in claim 30, wherein the one or more sensors comprise a color temperature sensor configured to measure a color temperature of light received by the color temperature sensor, and wherein the system controller is configured to control the color temperature value for the CCTLL of the plurality of CCTLLs in response to the color temperature of the light measured by the color temperature sensor.

32. The system as in claim 31, wherein the color temperature sensor is configured to measure a color temperature of the daylight, and the system controller is configured to match a color temperature value of at least one CCTLL of the plurality of CCTLLs with the color temperature of the daylight.

33. The system as in claim 30, wherein the one or more sensors comprise a color temperature sensor that is configured to measure a color temperature of the daylight, and the system controller is configured to control the color temperature value for the CCTLL of the plurality of CCTLLs such that a combined light from a light emitted by the CCTLL and the daylight is characterized with a color temperature value that is substantially equal to a desired color temperature value at a target surface or a location.

34. The system as in claim 30, wherein the one or more sensors further comprise an occupancy sensor for detecting whether a space is occupied or unoccupied, and wherein the system controller is configured to increase the color temperature value for the CCTLL in response to the occupancy sensor determining that the space is unoccupied.

35. The system as in claim 22, wherein the system controller is configured to determine a respective color temperature value for each CCTLL of the plurality of CCTLLs based on the information that comprises the data related to the power source.

36. The system as in claim 22, wherein the system controller is configured to receive state information and determine a respective color temperature value for each CCTLL of the plurality of CCTLLs based on the state information, wherein the state information comprises at least one of a time of day, a time of year, a demand response command, or an identity of media content being utilized in a vicinity of the plurality of CCTLLs.

37. The system as in claim 22, further comprising an input device having a user interface for receiving a user input, wherein the system controller is configured to control color temperature values of the plurality of CCTLLs in response to the user input.

38. The system as in claim 22, wherein the system controller is operable to control each CCTLL of the plurality of CCTLLs to emit light characterized by a same color temperature.

39. The system as in claim 22, wherein the plurality of CCTLLs are installed in a space, and the system controller is operable to control each of the plurality of CCTLLs to emit light characterized by different color temperatures to provide a gradient of the color temperatures across the space.

40. The system as in claim 22, wherein the plurality of CCTLLs are installed in a space having a window through which daylight enters, and the system controller is configured to control each CCTLL of the plurality of CCTLLs to emit light corresponding to different color temperatures, wherein a combined light from the plurality of CCTLLs and the daylight entering the space through the window provides a substantially constant color temperature profile across the space.

41. The system as in claim 22, wherein the system controller is configured to:
receive a signal representative of a demand response condition; and
increase the color temperature value of the CCTLL of the plurality of CCTLLs in response to the signal representative of the demand response condition.

42. The system as in claim 22, wherein the system controller is configured to:
control a heating or cooling system configured to control an ambient temperature in a space;
increase the color temperature value for the CCTLL while controlling the heating or cooling system to increase the ambient temperature; and
decrease the color temperature value for the CCTLL while controlling the heating or cooling system to decrease the ambient temperature.

43. The system as in claim 22, wherein the information comprises sensor information received from one or more sensor, wherein the sensor information received from the one or more sensors is associated with daylight measured by at least one sensor, and the system controller is further configured to:
determine, based on the sensor information, a color temperature value of the daylight measured by the at least one sensor of the one or more sensors, wherein the color temperature value for the CCTLL is determined relative to the color temperature of the daylight.

44. The system as in claim 22, wherein the color temperature value for the CCTLL is determined further based on a distance of the CCTLL from a source of daylight, and the system controller is further configured to control the plurality of CCTLLs to produce a gradient of color temperatures across the plurality of CCTLLs from the source of the daylight.

45. The system as in claim 22, wherein each CCTLL of the plurality of CCTLLs is configured to vary a color temperature of an emitted light by adjusting an intensity level of at least one discrete-spectrum light source.

46. An apparatus comprising:
a control circuit configured to autonomously control color temperature values of a controllable-color-temperature lighting load (CCTLL) based on information that comprises data related to a power source, wherein the control circuit is configured to:
receive the information that comprises the data related to the power source;
determine a color temperature value for a CCTLL of the plurality of CCTLLs based on the information that comprises the data related to the power source, wherein the data related to the power source indicates whether the CCTLL is powered by an emergency power source; and
control the CCTLL in order to operate the CCTLL at the color temperature value, wherein the CCTLL is controlled to a higher color temperature value if the CCTLL is determined to be powered by the emergency power source and a lower color temperature value if the CCTLL is determined to be powered by a power source other than the emergency power source.

47. The apparatus as in claim 46, wherein each of the plurality of CCTLLs comprises at least one control circuit, at least one communication circuit, at least two light sources, and at least two respective load regulation circuits for the at least two light sources, wherein at least one of the at least two light sources comprises a discrete-spectrum light source.

48. The apparatus as in claim 47, wherein the discrete-spectrum light source comprises one of a light emitting diode (LED) light source or a fluorescent light source.

49. The apparatus as in claim 46, wherein the control circuit is configured to receive sensor information from one or more sensors, wherein the sensor information from the one or more sensors is associated with daylight measured by at least one sensor of the one or more sensors.

50. The apparatus as in claim 49, wherein the control circuit is configured to control the color temperature values of the plurality of CCTLLs in response to a color temperature sensor.

51. The apparatus as in claim 50, wherein the control circuit is configured to match a color temperature value of at least one CCTLL of the plurality of CCTLLs with a color temperature of the daylight measured by the color temperature sensor.

52. The apparatus as in claim 49, wherein the one or more sensors further comprise an occupancy sensor for detecting whether a space is occupied or unoccupied, and wherein the control circuit is configured to increase the color temperature value of CCTLL in response to aft occupancy sensor determining that a space is unoccupied.

53. The apparatus as in claim 46, wherein the control circuit is configured to determine a respective color temperature value for each CCTLL of the plurality of CCTLLs based on the information that comprises the data related to the power source.

54. The apparatus as in claim 46, wherein the control circuit is configured to receive state information and determine a respective color temperature value for each CCTLL of the plurality of CCTLLs based on the state information, wherein the state information comprises at least one of a time of day, a time of year, a demand response command, or an identity of media content being utilized in a vicinity of the plurality of CCTLLs.

55. The apparatus as in claim 46, wherein the control circuit is configured to control color temperature values of the plurality of CCTLLs in response to user input received from an input device.

56. The apparatus as in claim 46, wherein the control circuit is configured to control a color temperature value of at least one CCTLL of the plurality of CCTLLs such that a combined light from a light emitted by the at least one CCTLL and daylight is characterized with a color temperature value that is substantially equal to a desired color temperature value at a target surface or a location.

57. The apparatus as in claim 46, wherein the control circuit is configured to control each CCTLL of the plurality of CCTLLs to emit light characterized by a same color temperature.

58. The apparatus as in claim 46, wherein the plurality of CCTLLs are installed in a space, and the control circuit is configured to control each of the plurality of CCTLLs to emit light characterized by different color temperatures to provide a gradient of the color temperatures across the space.

59. The apparatus as in claim 46, wherein the plurality of CCTLLs are installed in a space having a window through which daylight enters, and the control circuit is configured to control each CCTLL of the plurality of CCTLLs to emit light corresponding to different color temperatures, wherein a combined light from the plurality of CCTLLs and the daylight entering the space through the window provides a substantially constant color temperature profile across the space.

60. The apparatus as in claim 46, wherein the control circuit is configured to:
receive a signal representative of a demand response condition; and
increase the color temperature value of the CCTLL of the plurality of CCTLLs in response to the signal representative of the demand response condition.

61. The apparatus as in claim 46, wherein the control circuit is configured to:
control a heating or cooling system configured to control an ambient temperature in a space;
increase the color temperature value for the CCTLL while controlling the heating or cooling system to increase the ambient temperature; and
decrease the color temperature value for the CCTLL while controlling the heating or cooling system to decrease the ambient temperature.

62. The apparatus as in claim 46, wherein the information comprises sensor information received from one or more sensors, wherein the sensor information received from the one or more sensors is associated with daylight measured by at least one sensor of the one or more sensors, and the control circuit is further configured to:
determine, based on the sensor information, a color temperature value of the daylight measured by the at least one sensor, wherein the color temperature value for the CCTLL is determined relative to the color temperature of the daylight.

63. The apparatus as in claim 46, wherein the color temperature value for the CCTLL of the plurality of CCTLLs is determined based on a distance of the CCTLL from a source of daylight, and the control circuit is further configured to control the plurality of CCTLLs to produce a gradient of color temperatures across the plurality of CCTLLs from the source of the daylight.

64. The apparatus as in claim 46, wherein each CCTLL of the plurality of CCTLLs is configured to vary a color temperature of an emitted light by adjusting an intensity level of at least one discrete-spectrum light source.

* * * * *